(12) United States Patent
Healey et al.

(10) Patent No.: US 7,848,645 B2
(45) Date of Patent: Dec. 7, 2010

(54) IDENTIFYING OR LOCATING WAVEGUIDES

(75) Inventors: Peter Healey, Ipswich (GB); Edmund S R Sikora, Ipswich (GB); David J T Heatley, Felixstowe (GB); Mark A Shackleton, Ipswich (GB)

(73) Assignee: British Telecommunications Public Limited Company, London (GB)

( * ) Notice: Subject to any disclaimer, the term of this patent is extended or adjusted under 35 U.S.C. 154(b) by 495 days.

(21) Appl. No.: 11/663,957

(22) PCT Filed: Sep. 20, 2005

(86) PCT No.: PCT/GB2005/003594
§ 371 (c)(1),
(2), (4) Date: Mar. 28, 2007

(87) PCT Pub. No.: WO2006/035198
PCT Pub. Date: Apr. 6, 2006

(65) Prior Publication Data
US 2007/0264012 A1   Nov. 15, 2007

(30) Foreign Application Priority Data

| Sep. 30, 2004 | (GB) | ................................. 0421746.9 |
| Feb. 22, 2005 | (GB) | ................................. 0503645.4 |
| Mar. 18, 2005 | (GB) | ................................. 0505624.7 |

(51) Int. Cl.
*H04B 10/08* (2006.01)
*H04B 17/00* (2006.01)

(52) U.S. Cl. ........................................................ 398/16

(58) Field of Classification Search .................. 398/13, 398/16

See application file for complete search history.

(56) References Cited

U.S. PATENT DOCUMENTS

| 4,297,887 A | | 11/1981 | Bucaro |
| 4,370,610 A | * | 1/1983 | Allen et al. ................. 324/529 |
| 4,397,551 A | | 8/1983 | Bage et al. |
| 4,443,700 A | | 4/1984 | Macedo et al. |
| 4,463,451 A | | 7/1984 | Warmack et al. |
| 4,538,103 A | | 8/1985 | Cappon |

(Continued)

FOREIGN PATENT DOCUMENTS

EP   0 251 632 A2   1/1988

(Continued)

OTHER PUBLICATIONS

International Search Report for PCT/GB2005/003594 dated Dec. 16, 2005.

(Continued)

*Primary Examiner*—Shi K Li
(74) *Attorney, Agent, or Firm*—Patterson Thuente Christensen Pedersen, P.A.

(57) ABSTRACT

The location or identification of a waveguide is determined, in particular where a disturbance is applied to the optical waveguide. This is achieved by: (a) monitoring the waveguide at a first location to sense a disturbance along the waveguide; (b) causing a disturbance to the waveguide at a second location; (c) transmitting a sensor signal to the second location; and (d) inferring, from the sensor signal, the presence or identity of the waveguide at the second location.

26 Claims, 10 Drawing Sheets

U.S. PATENT DOCUMENTS

| | | | |
|---|---|---|---|
| 4,572,949 A | 2/1986 | Bowers et al. | |
| 4,593,385 A | 6/1986 | Chamuel | |
| 4,649,529 A | 3/1987 | Avicola | |
| 4,654,520 A | 3/1987 | Griffiths | |
| 4,668,191 A | 5/1987 | Plischka | |
| 4,688,200 A | 8/1987 | Poorman et al. | |
| 4,697,926 A | 10/1987 | Youngquist et al. | |
| 4,708,471 A | 11/1987 | Beckmann et al. | |
| 4,708,480 A | 11/1987 | Sasayama et al. | |
| 4,770,535 A | 9/1988 | Kim et al. | |
| 4,781,056 A | 11/1988 | Noel et al. | |
| 4,805,160 A | 2/1989 | Ishii et al. | |
| 4,847,596 A | 7/1989 | Jacobson et al. | |
| 4,885,462 A | 12/1989 | Dakin | |
| 4,885,915 A | 12/1989 | Jakobsson | |
| 4,907,856 A | 3/1990 | Hickernell | |
| 4,976,507 A | 12/1990 | Udd | |
| 4,991,923 A | 2/1991 | Kino et al. | |
| 4,994,668 A | 2/1991 | Lagakos et al. | |
| 4,994,886 A | 2/1991 | Nadd | |
| 5,004,912 A | 4/1991 | Martens et al. | |
| 5,015,842 A | 5/1991 | Fradenburgh et al. | |
| 5,025,423 A * | 6/1991 | Earp | 367/137 |
| 5,046,848 A | 9/1991 | Udd | |
| 5,051,965 A | 9/1991 | Poorman | |
| 5,093,568 A | 3/1992 | Maycock | |
| 5,104,391 A | 4/1992 | Ingle et al. | |
| 5,140,559 A | 8/1992 | Fisher | |
| 5,173,743 A | 12/1992 | Kim | |
| 5,187,362 A | 2/1993 | Keeble | |
| 5,191,614 A | 3/1993 | LeCong | |
| 5,194,847 A | 3/1993 | Taylor et al. | |
| 5,206,924 A | 4/1993 | Kersey | |
| 5,223,967 A | 6/1993 | Udd | |
| 5,311,592 A | 5/1994 | Udd | |
| 5,313,266 A | 5/1994 | Keolian et al. | |
| 5,319,609 A | 6/1994 | Regnault | |
| 5,351,318 A | 9/1994 | Howell et al. | |
| 5,355,208 A | 10/1994 | Crawford et al. | |
| 5,361,130 A | 11/1994 | Kersey et al. | |
| 5,363,463 A | 11/1994 | Kleinerman | |
| 5,373,487 A | 12/1994 | Crawford et al. | |
| 5,379,357 A | 1/1995 | Sentsui et al. | |
| 5,384,635 A | 1/1995 | Cohen | |
| 5,412,464 A | 5/1995 | Thomas et al. | |
| 5,457,998 A * | 10/1995 | Fujisaki et al. | 73/657 |
| 5,473,459 A | 12/1995 | Davis | |
| 5,491,573 A | 2/1996 | Shipley | |
| 5,497,233 A | 3/1996 | Meyer | |
| 5,500,733 A | 3/1996 | Boisrobert et al. | |
| 5,502,782 A | 3/1996 | Smith | |
| 5,592,282 A | 1/1997 | Hartog | |
| 5,604,318 A | 2/1997 | Fasshauer | |
| 5,636,021 A | 6/1997 | Udd | |
| 5,637,865 A | 6/1997 | Bullat et al. | |
| 5,663,927 A | 9/1997 | Olson et al. | |
| 5,691,957 A | 11/1997 | Spiesberger | |
| 5,694,114 A | 12/1997 | Udd | |
| 5,754,293 A | 5/1998 | Farhadiroushan | |
| 5,767,950 A | 6/1998 | Hawver et al. | |
| 5,778,114 A | 7/1998 | Eslambolchi et al. | |
| 5,936,719 A | 8/1999 | Johnson | |
| 5,975,697 A | 11/1999 | Podoleanu | |
| 5,982,791 A | 11/1999 | Sorin | |
| 5,991,479 A | 11/1999 | Kleinerman | |
| 6,072,921 A | 6/2000 | Frederick et al. | |
| 6,075,628 A | 6/2000 | Fisher et al. | |
| 6,115,520 A | 9/2000 | Laskowski et al. | |
| 6,148,123 A * | 11/2000 | Eslambolchi et al. | 385/13 |
| 6,194,706 B1 * | 2/2001 | Ressl | 250/225 |
| 6,195,162 B1 * | 2/2001 | Varnham et al. | 356/478 |
| 6,269,198 B1 | 7/2001 | Hodgson et al. | |
| 6,269,204 B1 | 7/2001 | Ishikawa | |
| 6,285,806 B1 | 9/2001 | Kersey et al. | |
| 6,315,463 B1 | 11/2001 | Kropp | |
| 6,381,011 B1 | 4/2002 | Nickelsberg | |
| 6,459,486 B1 | 10/2002 | Udd et al. | |
| 6,487,346 B2 * | 11/2002 | Nothofer | 385/109 |
| 6,594,055 B2 | 7/2003 | Snawerdt | |
| 6,625,083 B2 | 9/2003 | Vandenbroucke | |
| 6,628,570 B2 | 9/2003 | Ruffa | |
| 6,788,417 B1 | 9/2004 | Zumberge et al. | |
| 6,859,419 B1 | 2/2005 | Blackmon et al. | |
| 7,110,677 B2 | 9/2006 | Reingand | |
| 7,397,568 B2 | 7/2008 | Bryce | |
| 7,548,319 B2 | 6/2009 | Hartog | |
| 2001/0028766 A1 | 10/2001 | Hatami-Hanza | |
| 2002/0196447 A1 | 12/2002 | Nakamura et al. | |
| 2003/0103211 A1 | 6/2003 | Lange et al. | |
| 2003/0117893 A1 | 6/2003 | Bary | |
| 2003/0174924 A1 | 9/2003 | Tennyson | |
| 2004/0027560 A1 | 2/2004 | Fredin et al. | |
| 2004/0113056 A1 | 6/2004 | Everall et al. | |
| 2004/0201476 A1 | 10/2004 | Howard | |
| 2006/0256344 A1 | 11/2006 | Sikora et al. | |
| 2007/0009600 A1 | 1/2007 | Edgren et al. | |
| 2007/0065150 A1 | 3/2007 | Sikora et al. | |
| 2008/0013161 A1 | 1/2008 | Tokura et al. | |
| 2008/0018908 A1 | 1/2008 | Healey et al. | |
| 2008/0123085 A1 | 5/2008 | Sikora et al. | |
| 2008/0166120 A1 | 7/2008 | Heatley et al. | |
| 2008/0219093 A1 | 9/2008 | Heatley et al. | |
| 2008/0219660 A1 | 9/2008 | Healey et al. | |
| 2008/0278711 A1 | 11/2008 | Sikora et al. | |
| 2009/0014634 A1 | 1/2009 | Sikora et al. | |
| 2009/0097844 A1 | 4/2009 | Healey | |
| 2009/0103928 A1 | 4/2009 | Healey et al. | |
| 2009/0135428 A1 | 5/2009 | Healey | |

FOREIGN PATENT DOCUMENTS

| | | |
|---|---|---|
| EP | 0 360 449 A2 | 3/1990 |
| EP | 0 364 093 | 4/1990 |
| EP | 0364093 | 4/1990 |
| EP | 0 376 449 A1 | 7/1990 |
| EP | 0 377 549 | 7/1990 |
| EP | 0 513 381 | 11/1992 |
| EP | 0513381 | 11/1992 |
| EP | 0 592 690 A1 | 4/1994 |
| EP | 0 794 414 A2 | 9/1997 |
| EP | 0 821 224 A2 | 1/1998 |
| EP | 0 953 830 A2 | 11/1999 |
| EP | 1 037 410 | 9/2000 |
| EP | 1 037 410 A2 | 9/2000 |
| EP | 1 096 273 A2 | 5/2001 |
| EP | 1 236 985 | 9/2002 |
| EP | 1 385 022 A1 | 1/2004 |
| EP | 1 496 723 A1 | 1/2005 |
| FR | 2 751 746 | 1/1998 |
| GB | 2 015 844 A | 9/1979 |
| GB | 2 019 561 A | 10/1979 |
| GB | 2 113 417 | 8/1983 |
| GB | 2 126 820 A | 3/1984 |
| GB | 2 205 174 A | 11/1988 |
| GB | 2 219 166 | 11/1989 |
| GB | 2 262 803 A | 6/1993 |
| GB | 2 264 018 A | 8/1993 |
| GB | 2 401 738 A | 11/2004 |
| JP | 2001-194109 | 7/2001 |
| WO | WO 93/25866 A1 | 12/1993 |
| WO | WO 97/05713 A1 | 2/1997 |
| WO | WO 01/67806 A1 | 9/2001 |
| WO | WO 02/065425 A1 | 8/2002 |
| WO | WO 03/014674 A2 | 2/2003 |

WO    WO 2005/008443 A2    1/2005

OTHER PUBLICATIONS

Jang et al., "Noncontact Detection of Ultrasonic Waves Using Fiber Optic Sagnac Interferometer," IEEE Transactions on Ultrasonics, Ferroelectrics, and Frequency Control, vol. 49, No. 6, Jun. 2002, pp. 767-775.
Gupta et al., "Capacity Bounding of Coherence Multiplexed Local Area Networks Due to Interferometric Noise," IEE Proc.-Optoelectron., vol. 144, No. 2, pp. 69-74, Apr. 1997.
Liang et al., "Modified White-Light Mach Zehnder Interferometer for Direct Group-Delay Measurements," Applied Optics, vol. 37, Issue 19, Abstract, Jul. 1998.
UK Search Report dated Dec. 4, 2003 in GB Application No. GB 0322859.0.
International Search Report mailed Jan. 14, 2005 in International Application No. PCT/GB2004/004169.
International Search report mailed Dec. 1, 2005 in PCT/GB2005/003680.
U.S. Appl. No. 10/573,266, filed Mar. 23, 2006, Sikora et al.
U.S. Appl. No. 11/403,200, filed Apr. 13, 2006, Sikora et al.
U.S. Appl. No. 11/791,927, filed May 31, 2007, Sikora et al.
U.S. Appl. No. 11/791,923, filed May 31, 2007; Healey et al.
U.S. Appl. No. 11/663,954, filed Mar. 28, 2007, Sikora et al.
U.S. Appl. No. 11/885,275, filed Aug. 29, 2007, Heatley et al.
U.S. Appl. No. 11/885,400, filed Aug. 27, 2007, Heatley et al.
U.S. Appl. No. 11/916,054, filed Nov. 30, 2007, Sikora et al.
U.S. Appl. No. 11/887,382, filed Sep. 28, 2007, Healey et al.
U.S. Appl. No. 11/918,434, filed Oct. 12, 2007; Healey et al.
U.S. Appl. No. 12/295,784, filed Oct. 2, 2008, Healey et al.
U.S. Appl. No. 12/280,051, filed Aug. 20, 2008, Healey.
U.S. Appl. No. 12/280,047, filed Aug. 20, 2008, Healey.
U.S. Appl. No. 12/280,038, filed Aug. 20, 2008, Healey.
Office Action dated Sep. 19, 2008 in U.S. Appl. No. 10/573,266.
Office Action dated Mar. 17, 2009 in U.S. Appl. No. 10/573,266.
Office Action dated Jan. 23, 2009 in U.S. Appl. No. 11/403,200.
Office Action dated Jun. 6, 2008 in U.S. Appl. No. 11/403,200.
Office Action dated Aug. 23, 2007 in U.S. Appl. No. 11/403,200.
Office Action dated Mar. 25, 2009 in U.S. Appl. No. 11/885,275.
Office Action dated Jul. 7, 2009 in U.S. Appl. No. 11/885,400.
Office Action Jan. 14, 2009 in U.S. Appl. No. 11/885,400.
Office Action dated May 14, 2009 in U.S. Appl. No. 11/916,054.
Office Action dated Jul. 8, 2009 in U.S. Appl. No. 11/791,927.
Office Action dated Sep. 5, 2008 in U.S. Appl. No. 11/791,923.
Office Action dated Feb. 26, 2009 in U.S. Appl. No. 11/791,923.
International Search Report dated Nov. 22, 2005.
International Search Report mailed May 8, 2006 in PCT/GB2006/000750.
International Search Report mailed May 29, 2006 in PCT/GB2006/000759.
International Search Report mailed Jun. 30, 2006, dated Jun. 7, 2006, in PCT/GB2006/001173.
International Search Report mailed Jul. 17, 2007 in PCT/GB2007/001188.
International Search Report mailed Jul. 27, 2006 in PCT/GB2006/001993.
International Search Report mailed Apr. 13, 2007 in PCT/GB2007/000360.
International Search Report mailed Apr. 18, 2007 in PCT/GB2007/000343.
International Search Report mailed May 24, 2006 in PCT/GB2006/001325.
International Search Report mailed May 2, 2007 in PCT/GB2007/000359.
International Search Report dated Mar. 15, 2006, mailed Mar. 24, 2006 in PCT/GB2005/004873.
Uk Search Report dated May 24, 2005 in GB506591.7.
International Search Report dated May 16, 2006 in PCT/GB2005/004850.

Yilmaz M. et al., "Broadband vibrating quartz pressure sensors for tsunameter and other oceanographic applications," Oceans '04, MTTS/IEEE Techno-Ocean '04, Kobe, Japan, Nov. 9-12, 2004, Piscataway, NJ, USA, IEEE, Nov. 9, 2004, pp. 1381-1387, XP010776555; Internet version, Oceans 2004, Kobe, Japan, pp. 1-7, Redmond, WA USA.
Szustakowski et al., Recent Development of Fiber Optic Sensors for Perimeter Security, Military University of Technology, IEEE 2001, pp. 142-148.
"Fading Rates in Coherent OTDR," Electronics Letters, vol. 20, No. 11, May 24, 1984.
European Search Report, Application No. 05733029.2.-1524, dated Apr. 6, 2010, 7 pages.
State Intellectual Property Office of China, Text of First Office Action, Dated Aug. 15, 2008.
State Intellectual Property Office of China, Second Notification of Office Action, Application No. 200580009905.4, dated Mar. 27, 2009, 4 pages.
State Intellectual Property Office of China, Third Notification of Office Action, Application No. 200580009905.4, dated Jun. 19, 2009, 4 pages.
State Intellectual Property Office of China, Rejection Decision, Application No. 200580009905.4, Dated Dec. 4, 2009, 19 pages.
European Search Report, Application No. 05 784 078.7, dated Jul. 24, 2008, 4 pages.
Application and File History of U.S. Appl. No. 11/918,434, Inventors: Healey at al., filed Oct. 12, 2007.
Application and File History of U.S. Appl. No. 11/663,954, Inventors: Sikora et al., filed Mar. 28, 2007.
Application and File History of U.S. Appl. No. 12/280,038, Inventors: Healey et al, filed Aug. 20, 2008.
Application and File History of U.S. Appl. No. 11/887,382, Inventors: Healey et al., filed Sep. 28, 2007.
Application and File History of U.S. Appl. No. 12/295,784, Inventors: Healey et al., filed Oct. 2, 2008.
Application and File History of U.S. Appl. No. 10/594,433, Inventors: Healey et al., filed Sep. 26, 2006.
Application and File History of U.S. Appl. No. 12/280,047, Inventors: Healey et al., filed Aug. 20, 2008.
Application and File History of U.S. Appl. No. 12/280,051, Inventors: Healey et al., filed Aug. 20, 2008.
Application and File History of U.S. Appl. No. 11/403,200, Inventors: Sikora et al., filed Apr. 13, 2006.
Application and File History of U.S. Appl.1 No. 11/885,400, Inventors: Heatley et al., filed Aug. 30, 2007.
Application and File History of U.S. Appl. No. 11/885,275, Inventors: Heatley et al., filed Aug. 29, 2007.
Application and File History of U.S. Appl. No. 11/791,927, Inventors: Sikora et al., filed May 31, 2007.
Application and File History of U.S. Appl. No. 11/916,054, Inventors: Sikora et al., filed Nov. 30, 2007.
Application and File History of U.S. Appl. No. 11/791,923, Inventors: Healey et al., filed May 31, 2007.
Application and File History of U.S. Appl. No. 10/573,266, Inventors: Sikora et al., filed Mar. 23, 2006.
European Search Report, Application No. 05733029.2-1524, dated Apr. 6, 2010, 7 pages.
State Intellectual Property Office of China, Text of First Office Action, Dated Aug. 15, 2008.
State Intellectual Property Office of China, Second Notification of Office Action, Application No. 200580009905.4, dated Mar. 27, 2009, 4 pages.
State Intellectual Property Office of China, Third Notification of Office Action, Application No. 200580009905.4, dated Jun. 19, 2009, 4 pages.
State Intellectual Property Office of China, Rejection Decision, Application No. 200580009905.4, Dated Dec. 4, 2009, 19 pages.
European Search Report, Application No. 05 784 078.7, dated Jul. 24, 2008, 4 pages.

\* cited by examiner

IDENTIFYING OR LOCATING WAVEGUIDES

This application is the US national phase of international application PCT/GB2005/003594 filed 20 Sep. 2005 which designated the U.S. and claims benefit of GB 0421746.9, dated 30 Sep. 2004, GB 0503645.4, dated 22 Feb. 2005, and GB 0505624.7, dated 18 Mar. 2005, the entire content of each of which is hereby incorporated by reference.

BACKGROUND

1. Technical Field

The present invention relates to the location or identification of a waveguide, in particular where a disturbance is applied to the optical waveguide.

2. Related Art

It is known to locate cables or conduits by transmitting a ground-penetrating radar signal from a sensing position, and detecting a reflection from the cable or conduit at the sensing position. However, such techniques are not always suitable.

BRIEF SUMMARY

According to one aspect of the present invention, there is provided a method of locating or identifying a waveguide, the method including the steps of: (a) monitoring the waveguide at a first position to sense a disturbance along the waveguide; (b) causing a disturbance to the waveguide at a second position; (c) transmitting a sensor signal from the first position; and, (d) inferring, from the sensor signal, the presence or identity of the waveguide at the second position, the inference being made at the second position.

Because the waveguide is itself sensed, the sensitivity of the method is likely to be greater than in situations where reflected signals from the exterior surface of the waveguide or conduit (which reflections are likely to be weak) are received. Furthermore, because the inference as to the presence or identity of the waveguide is made at the second position, that is, in the vicinity of where the disturbance is generated, an operator generating the disturbance will conveniently be able to decide in feedback-like processes where or whether to generate further disturbances in dependence on the result of the generated disturbance.

Preferably, the sensor signal will be an audio signal. The audio signal may be transmitted continuously, such that the audio signal can be assessed in a continuous fashion, the presence of a disturbance being inferred from changes in the audio signal. In such a situation, the audio signal may have quiet periods (with background noise), the quiet periods being interrupted by signals representative of the disturbance being applied. For example, if a fibre or cable is struck with a light object, the sensor signal will be an audio signal having a tapping or knocking sound. In this way, the audio signal may be a microphonic representation of the acoustic characteristics of the disturbance, the waveguide acting as an acoustic pick-up. Preferably, the audio signal will be translated into an audible acoustic signal by loudspeaker means or other audio output device for producing audible signals. However, in one embodiment, the audio signal is itself an audible acoustic signal.

When an operator recognises a sound as corresponding to the disturbance the operator has introduced, the operator will be able to infer the identity or presence of the waveguide that is being monitored. Such an approach will conveniently allow an operator to disregard sounds not indicative of the deliberately introduced disturbance. Clearly, the microphonic representation need not be exact and certain frequencies may be picked up better than others by the waveguide.

The first and second positions may be different geographical locations. Monitoring apparatus for sensing a possible disturbance in the waveguide can be connected to an end of the waveguide (or via a tap in the waveguide), a disturbance being generated at one or more points remote from the point at which the waveguide is being sensed. An operator wishing to locate a waveguide can generate disturbances at intervals along a surface (such as the ground surface in the case of buried waveguides): when the disturbance is sensed at the waveguide, an inference can be made that the waveguide is present in a location that is proximate to that at which the disturbance originates.

An operator wishing to identify one or more of a plurality of waveguides can apply a disturbance to each of the waveguides in turn, preferably in a selective fashion, and infer the identity of the sensed waveguide in response to a disturbance being detected. For example, in the case where an operator wishes to identify one of a plurality of optical fibres in a cable or other common sleeve or conduit, the operator can strike each of the fibres in turn, and infer which of the fibres is the sensed fibre from the sensor signal generated in response to the disturbance applied to a particular fibre.

An operator may wish to correlate the respective ends of a bunch of fibres extending in a loop. In such a situation, the first and second positions may be different topological locations, but may only be separated by about 30 cm geographically.

The monitoring apparatus will preferably include: monitoring means such as a monitoring station for generating a sensor signal indicative of a disturbance in the fibre or other waveguide; and, wireless transmission means coupled to the monitoring means for transmitting a wireless sensor signal in response to, or at least indicative of, a generated sensor signal. Receiver means such as a receiver device may be provided, preferably in the form of a portable device, the receiver device being configured to generate a user-detectable signal such as an audio or visual signal in response to, or at least indicative of, a received wireless sensor signal. In this way, the operator can conveniently be made aware that a disturbance has been sensed by the monitoring apparatus. The wireless signal may be transmitted as a radio signal, and/or the wireless sensor signal may be transmitted over a cellular (mobile) telephone network. A wireless transmission of the sensor signal will be particularly useful if the first and second locations are geographically spaced apart. The separation between the first and second locations may be at least 10 m, for example if a fibre waveguide is at a junction box in a building, and an operator wishes to search for the fibre in the same building, on the same or different floors. However, the separation may be over 1 km, or even over 10 km in the case of transmission cables.

Preferably, the disturbance will be a mechanical disturbance, but the disturbance may be another dynamic or time-varying disturbance. In particular, the disturbance may be a mechanical vibration, such as an ultrasound or other acoustic disturbance or pressure wave.

The disturbance may be generated by a collision, for example the impact of an impact generating means on the ground surface or a surface of the waveguide itself. When the disturbance is applied to a waveguide directly, an operator will preferably use a lighter impact generating means, such as a hand held device (examples of which can include ordinary handheld objects such as a writing pen or table spoon), whereas if the waveguide is behind a surface or underground, heavier impact generating means may be used to generate acoustic vibrations in the medium behind the surface. For example, if the waveguide is buried underground, a hammer device may be employed on the ground surface to generate acoustic vibrations in the ground.

The or each waveguide may be an optical fibre, for example located in an optical cable, the cable having an outer jacket within which on or more optical fibres are held.

Preferably, the monitoring station will be configured to transmit sensing signals along the waveguide that is sensed, the sensing signals being returned to the monitoring station from a point along the waveguide that is beyond the region that is to be sensed. The signals may be reflected by a reflector such as that provided by a cleaved or cut surface at the end of the waveguide or fibre. Alternatively or in addition, the signals may be returned by a process of distributed backscattering along an optical fibre, preferably Rayleigh backscattering. For Rayleigh backscattering to return the signals sufficiently strongly, preferably 1 km of excess fibre will be provided beyond the furthest point where a disturbance is to be detected. The amount of excess fibre required will depend on the wavelength of the light (shorter wavelengths requiring shorter lengths of fibre), on the output power of the optical source for the sensing signals, and the sensitivity of a detector for detecting the returned sensing signals. Preferably, the wavelength will be between 1 and 2 microns, for example 1550 mm, 1480 nm or 1310 nm (each to within about +/−10%).

The sensing signals will preferably be formed by pairs of signal copies, the signal copies preferably being transmitted along the waveguide with a time delay relative to one another. A disturbance is likely to affect each signal copy of a pair in a different manner, with a result that the combination of the re-aligned signal copies can be used to indicate the presence of a disturbance.

Thus, the waveguide may be monitored by performing the following steps: copying at least in part output signals from a source, such that for each output signal, there is a pair of signal copies; transmitting the signal copies onto at least one waveguide; receiving from a remote region returned signal copies previously transmitted to the remote region, the remote region residing beyond the location at which a disturbance is applied; and, combining one signal copy of a pair with the other signal copy of that pair, such that, in dependence on the combination of the two signal copies of a pair, a combination signal is generated; and, in dependence on at least one characteristic of the combination signal, generating a disturbance alert signal (that is, a sensor signal).

The signal copies of a pair will preferably be transmitted on a common waveguide, and will then preferably be returned on the common waveguide, each copy of a pair preferably making the return trip in the same sense.

A characteristic of the combination signal indicative of a disturbance may be a change in the spectrum of the signal, or a change in amplitude in one or more frequency components of the signal. Alternatively, such a characteristic may be a change in the amplitude of the combination signal.

The output signals will preferably be optical signals from an optical source, in which case the waveguide will preferably be an optical fibre. A physical disturbance of the fibre is likely to lead to a strain in the fibre, which strain is likely to affect the optical properties of the transmission medium of the fibre, thereby changing at least the phase of the signals. Such changes in the optical properties of the fibre can then conveniently be detected when the respective signals of a pair are combined.

The output signals from a source will preferably have an irregular component, in which case the step of copying, at least in part, the output signal from the source will preferably result in the irregular component being common to each of the signal copies of a pair. Other characteristics of the signal need not be the same in each signal copy: for example, the signal copies may have different amplitudes. The irregular component will preferably be random, or pseudo random (by pseudo random, it is meant that although in theory a component is possible to predict, the time or processing power required to do this will make it in practice impossible to predict). If the output signal has a waveform, the irregular component may be provided by the phase of the waveform, for example if the waveform has randomly occurring phase variations. The waveform may conveniently be provided by an optical source having a short coherence time, preferably less than 10 pico seconds or even less than 1 pico second, the waveform being composed of a succession of wavetrains, each having a respective coherence length. Generally, the waveform will be much longer than individual wavetrains. The signals will in this situation normally be formed from successive portions of the waveform, without well defined boundaries being needed between successive signals or signal copies.

Preferably, the copies of a pair of signals will be delayed relative to one another at the first location, such that a leading copy and a trailing copy are transmitted from the first location, the leading copy arriving at the second location before the trailing copy. The signal copy can then be returned to the first location, where the trailing copy will preferably be delayed relative to the previously leading copy, such that both copies can be combined substantially in step with one another. In a preferred embodiment, the output from the optical source is fed to an interferometer stage, such as an unbalanced Mach Zehnder interferometer, where the signal is copied, one copy being channelled to one path of the interferometer, whilst the other copy is channelled to another path of the interferometer, the transit time associated with each path being different, such that a relative or differential delay results between the time at which the signal copies are transmitted from the interferometer stage. The same interferometer stage can then be employed to re-align to returned signal copies of a pair in a particularly convenient manner, since the relative delay imposed in the outbound direction will be the same as the relative delay imposed in the return direction, this being in each case determined by the difference in the transit times of the two paths. In such a situation, the combination of the re-aligned signals will result in an interference signal being output from the interferometer stage.

The differential delay will preferably be chosen in dependence on the average coherence time of the source. The differential delay will preferably be much longer than the coherence time. Preferably, the ratio of the differential delay to the coherence time will be greater or equal to $10^3$, yet more preferably $10^5$ or even yet more preferably $10^7$ or $10^9$.

The signal may be output from the source as a continuous stream. In such a situation, the signals transmitted onto the link will only be conceptually distinct from one another, since in practice adjacent signals will be joined seamlessly. However, the output from the source may also be pulsed or operate in burst mode.

In one embodiment, the path length between the first and second locations is evaluated using an OTDR method, the source being configured to generate pulses which are returned by a process of distributed backscattering, the pulses being preferably transmitted through the interferometer stage so as to generate signal copies. The backscattered signals originating from the signal copies can then be combined using the same interferometer in a similar fashion to that described above to produce an interference signal. A disturbance and its position along the fibre can then be determined by an analysis of the interference signal from the interferometer as a function of time.

Using the OTDR method, the path length between the first location and the second location can be evaluated. Furthermore, if a disturbance is applied at a third location, the path length between the first location and the third location can also be evaluated. By determining whether the path length between the second and third locations exceeds the geographical distance between these two locations (to within a tolerance level), it can be determined whether the fibre path extends along a looped path between the second and third locations or whether the fibre extends in a generally straight line. Preferably, if the difference is beyond the tolerance level, an alarm signal can be generated by the receiver device. When the alert signal is generated, the operator can probe the ground at shorter intervals in order to better follow the fibre path. Thus, the path of the optical fibre can be more easily or accurately charted, reducing the risk that large looped portions exist between points at which the presence of the fibre has been ascertained.

Further aspects of the invention are specified in the appended claims.

BRIEF DESCRIPTION OF THE DRAWINGS

The invention will now be further described, by way of example only, with reference to the following figures in which:

FIG. 1 shows a fibre monitoring system 10 for use with the present invention. A fibre 16, beneath the surface 102 of the ground, extends between a monitoring station 12 and an outstation 14. The monitoring station 12 is arranged to sense if a disturbance occurs to the fibre 16. In the event of a disturbance being sensed, the monitoring station 12 generates a sensor signal 104, which sensor signal is passed to a transmitter station 106. The transmitter station 106 has transmitter means including an aerial 108 for transmitting the sensor signal as a radio or other wireless signal. A receiver station 110 having wireless receiver means, here a corresponding aerial 112, receives the sensor signal, and in response produces a user-detectable signal, such as an audio signal, or a visual signal on a display 111. In order to locate the presence of the fibre from above the ground level, where the fibre cannot be seen, an operator generates acoustic disturbances, for example by means of a mechanical hammer device 114, into the ground at successive spaced apart locations, here labelled A, B, C, D. The acoustic vibrations 116 resulting from the hammer impact on the ground propagate as a wave some distance from the impact point. When at position D the impact point is sufficiently close to the fibre 16, the disturbance caused by the acoustic vibration 116 will be detected at the monitoring station. In response, a wireless signal will be transmitted by the transmitter station. The wireless sensor signal will be received at the receiver, and the operator will receive an indication of the sensor signal, for example from the receiver display. The operator will then be able to infer that the fibre is in the vicinity of the hammer device at position D.

A disturbance at A, B, or C will not be detected because at each of these points, no part of the fibre is sufficiently close for the disturbance to be detected. In this way, the operator will be able to infer that the fibre is not located within the vicinity of points A, B, or C, but that the fibre is located within the vicinity of point D.

The extent of the vicinity surrounding the impact point within which the fibre must be located in order that a sensor signal is generated will be determined by, at least in part, the sensitivity of the sensor, and the magnitude of the disturbance. Therefore, the operator can introduce strong disturbances at widely spaced locations, and, when the presence of the fibre is detected, the operator can reduce the magnitude of the disturbances, and introduce the disturbances at more closely spaced intervals, in order to more accurately determine the location of the fibre.

Figure 1:
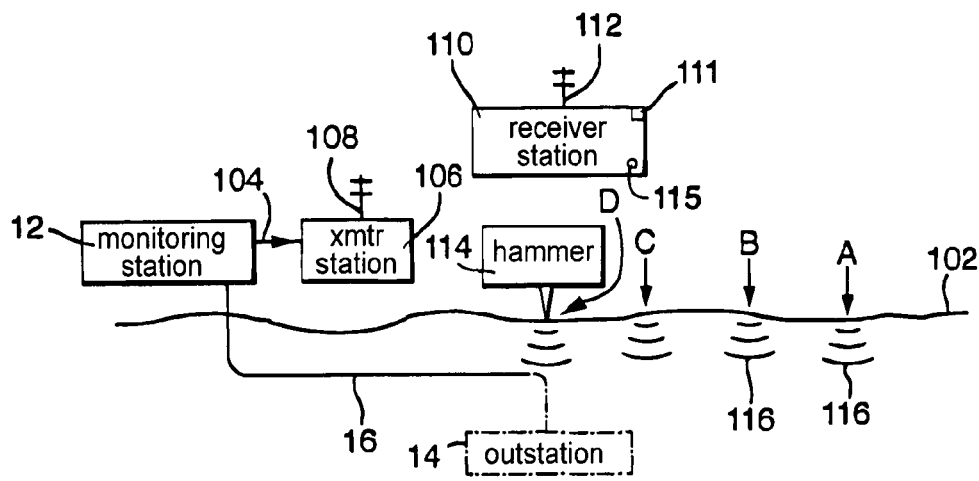
FIG. 1 shows a monitoring arrangement for use according to the present invention.
Figure 2:
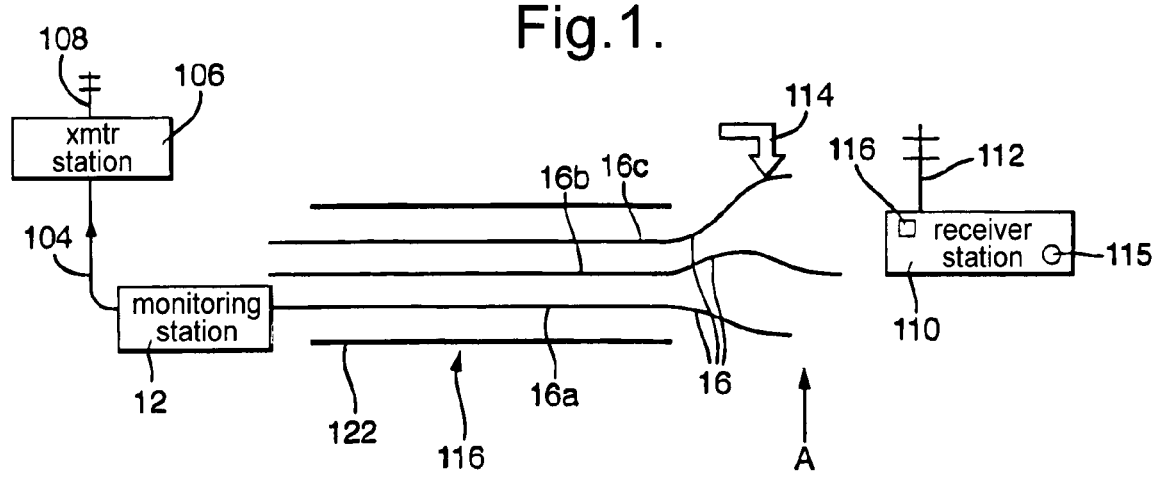
FIG. 2 shows another embodiment of a monitoring arrangement.

FIG. 2 shows another embodiment of the invention, like components in FIGS. 1 and 2 having like numerals. Here, a fibre cable 116 includes a plurality of fibres 16 within a sheath or other sleeve 122 (which sleeve may be located within a conduit not shown), the far ends of the fibres extending beyond the sleeve. One of the fibres 16a is monitored for disturbances by the monitoring station 12 and is connected thereto at one end. The monitoring station is connected to a transmitter station 106 functioning in a similar fashion to the transmitter station of FIG. 1. Likewise, a receiver 110 is arranged to receive wireless sensor signals from the transmitter station 106, and generate a visible or audible user-detectable in response to receiving a sensor signal. Thus, if an operator wishes to identify which of the plurality of fibres 16 is the sensed fibre 16a, the operator can apply a disturbance to each of the fibres in turn, the operator being able to infer the identity of the fibre 16a when a user-detectable signal is produced by the receiver (the disturbance being applied to the loose ends of the fibres individually, such that the disturbance applied to fibre 16b or 16c is not sensed by fibre 16a). In the embodiment of FIG. 2, the reflection of the sensing signals in the fibres can be achieved from, for example, respective reflectors at the ends of the fibres. A reflector may be formed by a mirrored surface, or simply by the glass/air interface at the cleaved end of an optical fibre.

Figure 3:
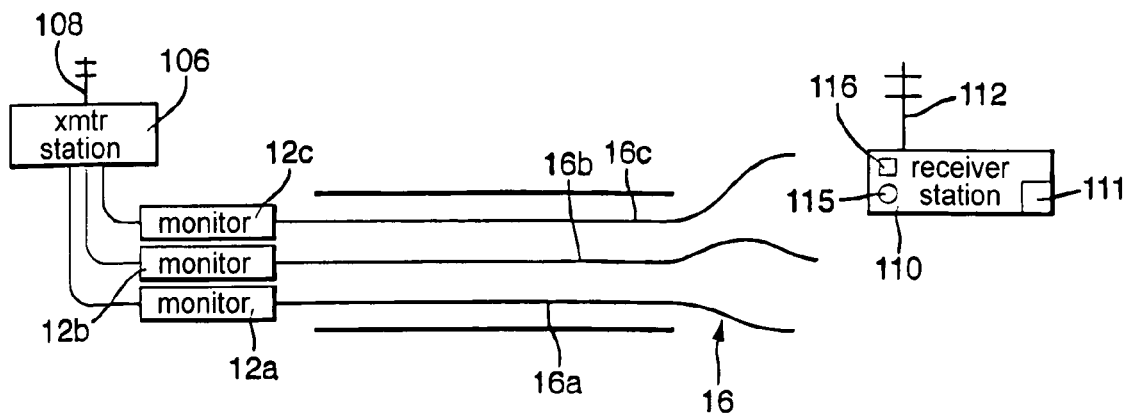
FIG. 3 shows a further embodiment.

In a further embodiment shown in FIG. 3, the sensor station 12 may have a plurality of sensors 12a, 12b, 12c, each arranged to detect a disturbance on a respective one of the cables 16a, 16b, and 16c. In this situation, the transmitter station, which is connected to each of the sensors 12a, 12b, 12c, is configured to transmit a sensor signal indicative of which of the sensor stations 12a-12c has produced a sensor signal. The receiver 110 is likewise configured to produce, in response to a sensor signal, a user-detectable signal indicating which of the sensor stations has produced the sensor signal: for example, the receiver may simply display a character such as a letter A-C on a display 111, each character being associated with one of the fibres. In this way, the operator will be able, by selectively disturbing each of the cables 16a, 16b, 16c, to the identity of each of the cables on the basis of the character displayed at the receiver.

In general terms, the basic disturbance monitoring system architecture (for use in the monitoring station of FIG. 1 or 2) comprises an optical source for generating sensing signals to be transmitted onto the fibre, an unbalanced Mach-Zehender interferometer (with a fibre delay and polarisation scrambler "POL" in one arm), an analogue optical receiver, filter and a signal processing system. The far end of the system being monitored provides a reflection (e.g., from an un-terminated fibre connector or a cleaved fibre end). In order to locate a conventional optical data transmission system, the sensing signals may be wavelength division multiplexed onto the fibre on one channel, data being transmitted on another channel.

Light from the sensor source is split into two paths in the Mach-Zehender interferometer; one path is connected directly through and one goes via an optical delay line of several km of standard fibre and a polarisation controller. Thus the fibre under test conveys two copies of the source signal, one delayed by an amount 'D' relative to the other. The phase, polarisation and amplitude of these signals are perturbed by the disturbance in both the forward and reverse directions of propagation. On returning to the interferometer the differential delay 'D' is effectively un-done for one pair of propagating signals and thus the signals will be within the coherence length of the source. Optical interference takes place at a 2×2 port coupler nearest the receiver creating an intensity modulated output signal that is sensitive to micro disturbances along the fibre under test.

Different types of disturbance will give rise to different characteristic signatures that can be identified by their spectral content. In practical experiments we have found that this system is so sensitive that it can detect the micro-strain changes induced by sound pressure waves picked up in the fibre under test (which therefore acts as a fibre microphone). By connecting the receiver output to a loudspeaker we could listen to the sounds (talking) and vibrations (movement) within the laboratory.

We have performed an initial theoretical analysis of the operation of this instrument that explains the nature of the experimental results observed. The analysis shows that the predominant cause of the observed signal is due to phase modulation of the sensing signal. We have also confirmed operation with different types of optical source, ranging from a highly un-coherent source of un-polarised amplified spontaneous emission (ASE) generated by a Erbium doped fibre amplifier (EDFA) (coherence length ~0.1 mm) to a typical systems distributed feedback (DFB) laser (coherence length ~20 m). We have also used a multi-longitudinal mode Fabry-Perot laser.

Figure 4:
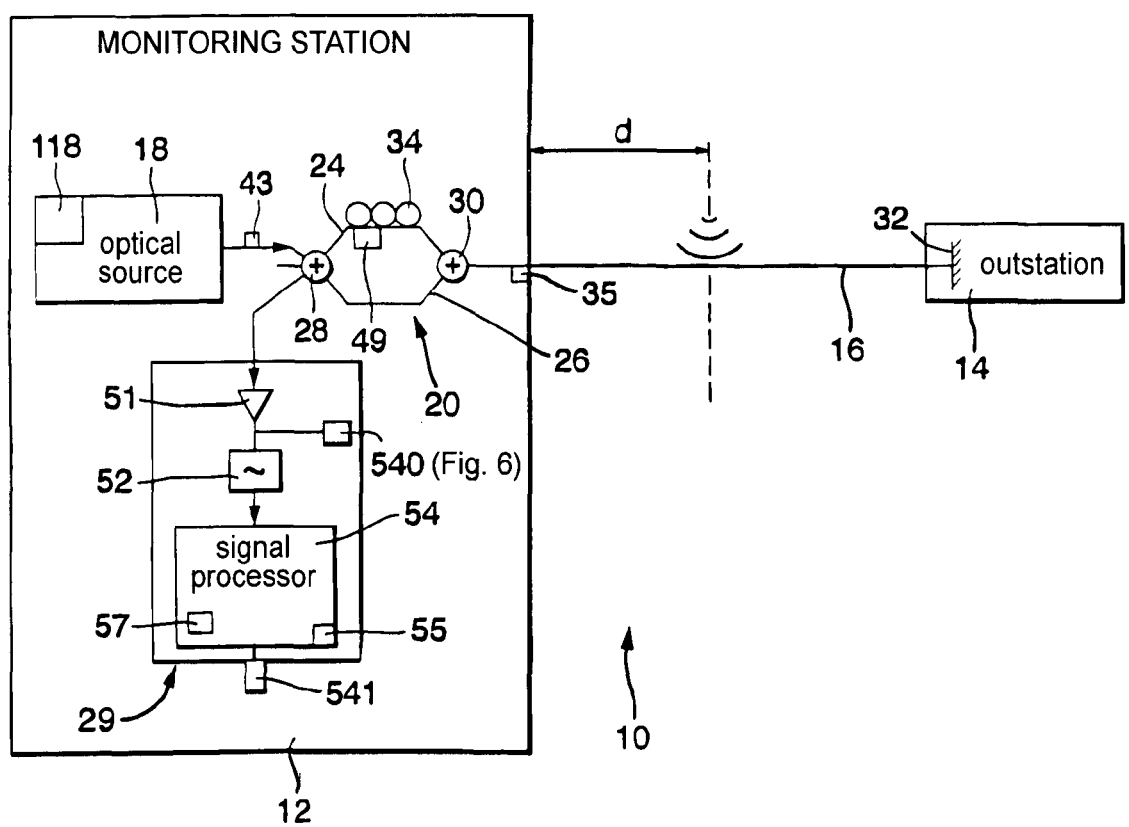
FIG. 4 shows in more detail an embodiment of a monitoring system for detecting a disturbance suitable with the embodiments of FIGS. 1 to 3.

To explain in more detail the operational principles of the system for detecting a disturbance, a simpler system will now be described in detail. FIG. 4 shows a fibre monitoring system in which a monitoring station 12 can monitor an optical communication link or fibre 16 extending between the monitoring station 12 and an outstation 14. The monitoring station 12 includes an optical source 18 with a short coherence time (random phase changes in the output providing an irregular component to the signal). A sensing signal having the form of waveform portions (hereinafter referred to as signals) from the optical source 18 are fed to an interferometer stage 20, here a Mach Zehnder interferometer having a first path 24 and a second path 26. The interferometer 20 includes a first coupling stage 28 for coupling optical radiation between the optical source 18, the first and second paths 24, 26, and signal processing system 29. For light travelling in a forward direction, that is, towards the outstation 14, the first coupling stage 28 acts as a directional power (intensity) splitter, channelling light from the optical source 18 to each of the paths 24, 26, the power to each path being shared in a predetermined manner.

In the present example, the first coupling stage acts as a 50:50 power splitter, the power input to each path being equal. Consequently, for each signal provided by the optical source 18 in a given time interval, that signal is copied such that there is a first copy and a second copy, the first and second copies being duplicates of one another. One copy travels along the first path 24 whilst the other copy travels along the second path 26. A second coupling stage 30 is provided for coupling light between the first and second paths 24, 26 and an output 35 of the interferometer, which output is connected to the optical link 16. For light travelling in the forward direction, the coupling stage 30 acts as a combiner, combining the light from the first and second paths and channelling this combined light to the interferometer output 35. The first path of the interferometer has a delay stage 34 for increasing the transit time of light travelling therealong between the first and second coupling stages 28, 30, such that the transit time for light travelling between the coupling stages 28, 30 is longer along the first path 24 than it is along the second path 26. For each signal produced by the optical source, the interferometer 20 serves to delay one of the signal copies relative to the other signal copy, the signal copies being transmitted onto the link 16 at different times to one another.

The additional (differential) delay imposed by the delay stage 34 is much greater than the coherence time of the optical source 18. Thus, when light travelling along the first and second paths is recombined by the second coupling stage 30, the interference between light travelling along the two paths averages out, such that on average (over a timescale much greater than the coherence time) the amplitude of light upon recombination at the second coupling stage 30 is of constant amplitude 18.

The outstation 14 comprises reflector means, such as a reflecting surface 32 for returning signals to the base station 12. Alternatively, the reflector means may be formed by a loop, the end of the fibre link 16 being connected to a point along the fibre at a 3-way coupler or circulator so as to form the loop.

For return signals travelling in the return direction, that is, for return signals arriving at the interferometer 20 from the outstation 14, the second coupling stage 30 act as a power splitter, in a similar fashion to the action of the first coupling stage 28 on light in the forward direction from the optical source 18. In this way, return signals are copied at the second coupling stage 30, one copy being channelled along the first path 24, whilst the other copy is channelled along the second path 26. The first coupling stage 28 then serves to combine light from the first and second paths in the return direction, channelling the combined light to a signal processing system 29.

For each signal generated by the source 18, there are thus four duplicates of this signal: a non-retarded signal S0 which has traveled along the second path 26 of the interferometer 20 in both the forward and reverse directions; a first retarded signal S1 delayed by a delay D in the forward direction (but not the reverse direction); a second retarded signal S2 retarded by the delay D in the reverse direction (but not the forward direction); and, a twice-retarded signal S3 retarded by a delay 2D, signal S3 being retarded in each of the forward and reverse directions.

The first and second retarded signals S1, S2 which are retarded in one direction only will return to the first coupler stage 28 at the same time. In the absence of any disturbance in the fibre 16, these signals are copies of one another and the signals will interfere or otherwise combine constructively at the first coupler stage 28. However, if one of the pair of signals S1, S2 is modulated or otherwise modified by a disturbance along the fibre, the interference between the two signals will result in an interference signal having different spectral characteristics to the interference signal which would otherwise be produced in the absence of any disturbance to the fibre 16.

The signal processing system 29, receives from the coupling stage 28 an optical interference signal produced at the first coupling stage as a result of interference between a signals which were originally copies of one another (e.g. S1 and S2). The signal processing system 29 is configured determine from the combination signal if the fibre 16 has been disturbed, preferably physically disturbed in a dynamic fashion.

A physical disturbance (caused for example by a displacement, an acoustic or ultrasound wave or other vibration) is likely to result in a change in the transmission properties of the link. In particular, in the case of an optical fibre link, a physical disturbance is likely to result in strain which will change the optical path link of the strained portion of the fibre, either through a change in the refractive index or a change in the physical length, or both.

This is likely to cause a phase and/or amplitude modulation in one of both of the (carrier) signals of a pair travelling along the link. However, the interference signal will be the result of interference between one the one hand a signal having been modulated by the disturbance at one time, and on the other hand, a signal modulated by the disturbance at another time, the two times being separated by the differential delay D. Thus, a physical disturbance in the optical link 16 is likely to result in a change in the interference signal from the first coupling stage 28.

A disturbance is likely to change the spectrum as well as the level of the interference signal, such that different disturbances will have different characteristic spectrum types. The distance between the base station and the point where a disturbance is occurring may also affect the spectrum. In general terms, the signal processing system 29 can then detect a disturbance by monitoring the interference signal and detecting an increase or other change in the signal beyond a threshold value, interference signal levels beyond this threshold value being deemed indicative of a disturbance. The signal processing system 29 may be configured to compare the signal spectrum at intervals with stored spectrum signatures for known disturbances, and to generate a disturbance alert signal if a monitored spectrum is found to match one of the known signatures. Alternatively, or in addition, the signal processing system 29 may be configured to run a learning algorithm in order to learn the characteristic spectrum types for different disturbances experienced along the particular optical fibre path which is being monitored.

The light source may be a Light Emitting Diode, a Fabry-Perot Laser Diode, or a source of amplified spontaneous emission such as an Erbium-Doped Fibre Amplifier or a Semiconductor Optical Amplifier, but preferably the light source will be a Super Luminescent Diode, since this has a broad and smooth power spectrum, and a short coherence time of about 0.5 pico seconds. The radiation produced by the optical source will preferably be unpolarised, or alternatively a de-polarising unit 43 may be provided between the light source and the interferometer, for depolarising the light before the light is injected into the interferometer (the depolarising unit may be for example, a Fibre Lyot de-polariser). A depolariser 49 will preferably be provided in one of the paths of the interferometer, here, the first path, so that the polarisation of light from the first path combining in the return direction at the first coupler 28 is at least partially aligned with that of the light from the other path. Typically, the source will operate at a wavelength of between 1 micron and 2 microns, preferably around 1.31, 1.48 or 1.55 microns, in order to efficiently make use of standard telecommunications optical fibre, such fibre being configured to support single mode transmission at this wavelength. Typically, the fibre will have a single core of a diameter which is around 9 or 10 microns.

The signal processing system includes: a photo-receiver 51 coupled to the first coupling stage 28 for converting optical signals into electrical signals; a filter 52 for receiving electrical signals from the photo-receiver 51 and filtering the electrical signals; and, a signal processing unit 54 for processing the filtered electrical signals and generating a sensor signal at an output 541 when a disturbance is detected on the fibre (the output 541 will be coupled to the transmitter 106 in the embodiments of FIGS. 1 and 2).

The filter 52 is configured to allow signals to pass within a bandwidth of about a few kHz to few tens of kHz, e.g., to about 60 kHz, since this is the bandwidth expected for signals brought about by most physical disturbances in a fibre. The signal processing unit 54 is configured to perform a spectrum analysis of the (filtered) interference signal from the coupling stage 28, for example by performing Fourier Transform on the interference signal, to transform the time dependent interference signal into a spectrum which has the frequency components forming that time dependent signal. The measured spectrum is then compared with known spectra or signatures resulting from known disturbances in a fibre. Such known signature spectrum (or at least the characteristic frequency components of such signature spectra) will be stored in a memory location 55 of the signal processing unit 54.

To compare a measured spectrum with a known signature spectrum, the following steps may be performed by a processor 57 of the signal processing unit 54: (a) determine which, if any, frequency components are above a threshold value, and (b) determine if these frequency components coincide (within a tolerance level) with the characteristic frequency components of known signature spectra. Thus, for each measured spectrum, a respective comparison step will be performed with each of the stored signature spectrum. If only the characteristic components of a signature spectrum are stored in the memory location 55, the information stored for each signature spectrum may simply include a list of characteristic frequencies for that spectrum. The processor 57 can then compare the respective frequency values of each component of a measured spectrum with the frequency values of a signature spectrum. A score value indicative of the degree of correlation between a measured spectrum and a signature may then be generated, and an alarm may be triggered if the score value exceeds a threshold.

To determine the degree of correlation, the following steps may be performed; (a) for a frequency component of a measured spectrum, determine whether a signature spectrum has a frequency component within a tolerance level of the measured frequency component, incrementing a score value counter if a match is found; (b) for each frequency component in the measured spectrum above a threshold, repeat step (a) with respect to that signature spectrum, incrementing the score value counter each time a match is found; and, (c), associating a score value with the final value of the score value counter, for each measured spectrum in respect of at least one signature spectrum.

The memory location 55 may also store an amplitude value associated with each frequency component of a signature spectrum. The processor 57 may then perform a more sophisticated algorithm, in which when determining the degree of correlation between a frequency spectrum and a measured spectrum, the similarity of the frequency values as well as the amplitude of the corresponding components is taken into account when incrementing the score value counter. The memory location 55 will preferably be configured to store interference signals received within a time interval, the comparison between a measured spectrum and signature spectra being performed in respect of each captured or measured spectrum in each time interval.

The first coupling stage 28, at the source side of the interferometer, will preferably be a 3×3 coupler (with some ports terminated), whereas the second coupling stage 30, at the transmission side, will preferably be a 2×2 coupler, with one port terminated. The 3×3 coupler is used in order to create a relative phase bias of $\phi_b = 120°$ between the optical fields on its output ports. This can be used to improve the sensitivity of the interferometer when detecting disturbances due to cable handling, street works or unauthorised interference. (We denote the phase modulation due to a disturbance as $\phi_d(t)$.). It can be shown that the receiver ac output signal is proportional to: $r_{ac}(t) = k \cdot \text{Cos} \{\phi_b + \phi_d(t) + \phi_m(t)\}$ where, k is a constant of proportionality and $\phi_m(t)$ is the data phase modulation signal. The equation shows how the phase bias can be used to select a higher slope region of the Cosine function in order to improve the sensitivity when the magnitude of the disturbance is small.

In one preferred embodiment, the processing unit 54 will be an audio amplifier, for amplifying the filtered audio signals resulting from the interference of the returned signals interfering at the first coupling stage 28. The transmitter station 106 will be configured to receive the audio signals output from the audio amplifier at the output 541 thereof, and transmit these signals to the receiver station 110, here a portable device. The receiver station 110 of FIGS. 1 to 3 has a loud speaker 115 (which may replace the display 111), and an amplifier 116 for amplifying the received wireless audio signal, so that the audio signal can be converted into an audible sound by the loud speaker, which sound will be heard by the operator. The audio signal will be indicative of the disturbance on the fibre, the fibre acting as a pick-up, the audio signals being a reproduction, at least in part, of the acoustic disturbance applied to the fibre.

The operator will be able to continuously monitor the acoustic signal from the fibre, and will be able to recognise from the audio signal (heard by the operator as an acoustic signal) the disturbance the operator has introduced onto the fibre. For example, if the operator in the embodiment of FIG. 2 strikes one of the fibres 16a, 16b, 16c, the operator will be able to recognise the striking sound in the amplified audio signal, the striking sound recognised by the operator as a sensor signal above the background noise, if any. Because the fibres 16a, 16b, 16c are mechanically coupled by the sleeve 122, it may be that a disturbance on one of the non-sensed fibres 16b, 16c will be heard. If this situation arises, the operator can strike each of the fibres and infer which fibre is the sensed fibre in dependence on which fibre gives rise to the loudest amplified audio signal (i.e., which fibre gives rise to the strongest sensor signal).

In a similar fashion, an operator wishing to locate a cable may apply disturbances at different points, moving in one direction and then another in dependence on the strength of the received audio signal: when the operator hears, through the receiver station 110, that the sound is getting louder, the operator will move further in the direction giving the loudest sound. Once the operator had identified a conduit, duct or other channel for containing a plurality of cable (and/or fibres), the operator can then free the cables from the conduit and apply a tapping disturbance to each cable in turn, identifying the sensed cable as the one giving the loudest sensor signal. If the operator then needs to identify which fibre of the cable is the one that is being sensed, the operator can free the fibres from their common sleeve, and again strike each fibre in turn.

For situations when a large disturbance is applied to the ground, the receiver station could include an earpiece, or headset, such as a noise-canceling headphone to distinguish, from the direct noise of the applied disturbance, the signal from the receiver.

Thus, it is possible, in this example by a feedback process, using an audio sensor signal, to infer from the sensor signal when a waveguide has been located or identified.

Figure 5:
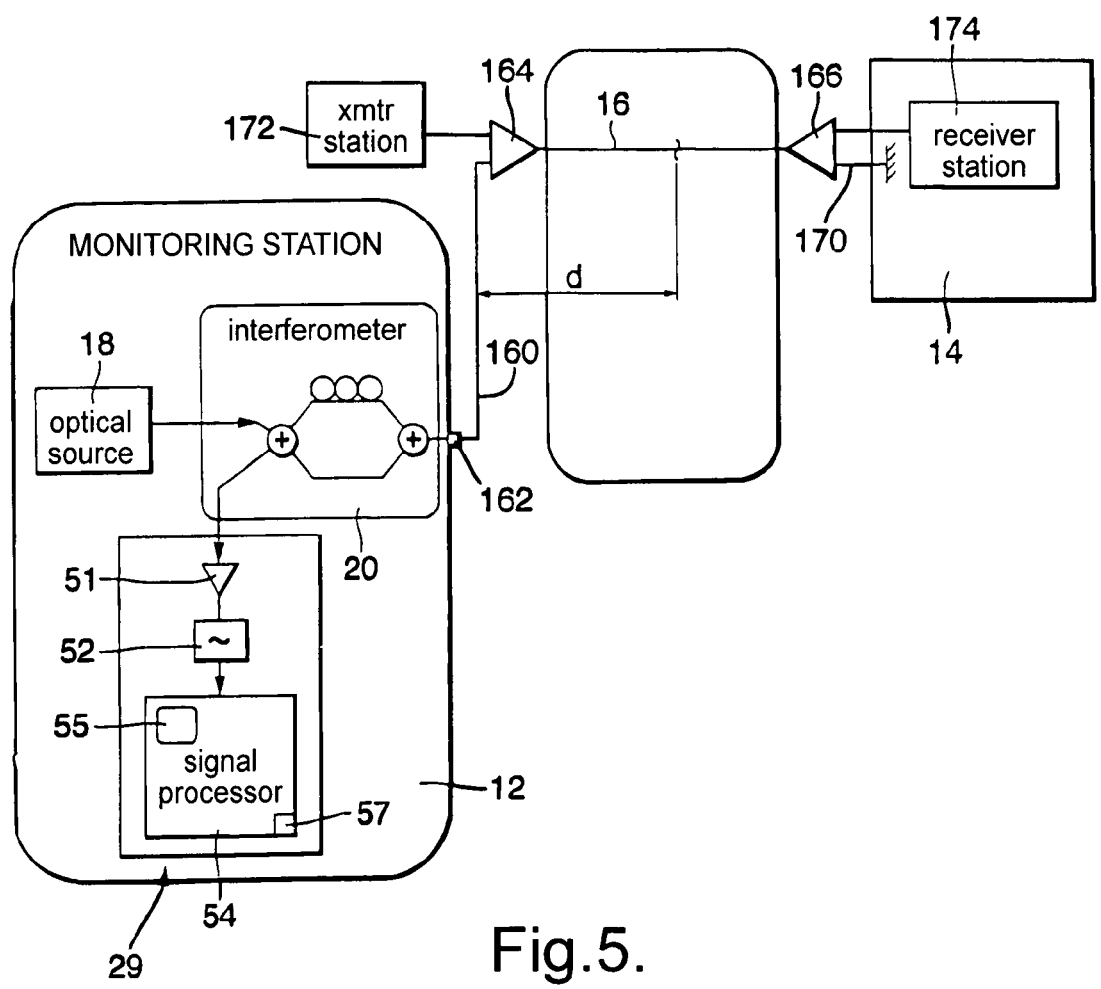
FIG. 5 shows how a monitoring system may be used with a data carrying fibre.

In FIG. 5, a communications link 16 is coupled to the monitoring system by a coupling fibre 160, which coupling fibre is connected to the coupling station 12 at a connector 162. Radiation from the coupling fibres 160 is introduced into the link 16 by a first wavelength coupler 164 at the input end of the link 16 (i.e., the monitoring side), whilst at the output end of the link 16 (away from the monitoring side), there is provided a second wavelength coupler 166, such that light from the link 16 can be coupled to an end reflector 168 located at the end of a termination fibre 170, the termination fibre 170 connecting the second wavelength coupler 166 to the reflector 168. A transmitter station 172 and a receiver station 174 are respectively connected to the first and second wavelength couplers 164, 166.

The wavelength couplers 164, 166 are each configured such that using a wavelength division multiplexing technique, data can be transmitted over the link 16 between the transmitter and receiver stations 162, 164 at one wavelength, whilst radiation from the monitoring station 12 is carried at another wavelength over the fibre link 16, radiation from the transmitter station 172 and the monitoring station 12 being transmitted over a common fibre or medium within the link 16.

At the second wavelength coupler 166, light at the wavelength of the source 18 is directed from the link 16 and to the termination fibre 170, where, upon reflection at the reflector 168, the radiation is reflected and returned into the link 16, for return transmission to the monitoring station. In this way, communication can take place along the link 16, whilst the link is being monitored, without unduly affecting the communication (although a disturbance along the fibre path formed by the coupling fibre 160, the fibre link 16 and the termination fibre 170 may be detected). In an alternative embodiment, the communications link 16 is a cable having a plurality of optical fibres, although the coupling fibre onto which signal streams are launched from the interferometer 20 will preferably be a single fibre. In such a situation, the coupling fibre 160 will simply be coupled to one of the transmission fibres of the link 16, which fibre will be coupled at an opposing end to the reflector 168. Thus, signals between the transmitting station 172 and the receiving station 174 can still be carried over the other transmission fibres, a disturbance in the monitored fibre being indicative of a disturbance in the cable generally.

As can be seen from the above description, the present embodiments provide a simple and sensitive way of monitoring a fibre to detect the occurrence of a disturbance and thereby locate a fibre link.

To determine the distance along the fibre path between the monitoring station 12 and a disturbance point, an Optical Time Domain Reflectometry (OTDR) method can be employed, in which optical pulses returned from along the length of the link 16 are monitored as a function of time. The pulses are returned by a process of distributed backscattering in which part of the energy or intensity of a signal is reflected in an at least partly continuous fashion as the signal propagates along the link. The apparatus of FIG. 4 may be used to this effect, a further signal processing unit 540 being provided to process the return signals according to OTDR operation. In addition, for OTDR operation, the source 18 is operated in pulse mode, pulses being typically 1 microsecond in duration, launched from the source 18 every 1 ms. Whereas outbound signals are formed by pulses, the return signal is distributed over time. A temporal characteristic in the interference signal from returned sensing signals, for example the time position of a feature in the interference signal, may then used to infer at least the topological position of a disturbance along the link 16. Preferably, a returned signal is recorded as a function of time, and preferably displayed as a trace on a display device. In this way, a feature in the interference signal may be associated with a position or distance along the link.

Figure 6:
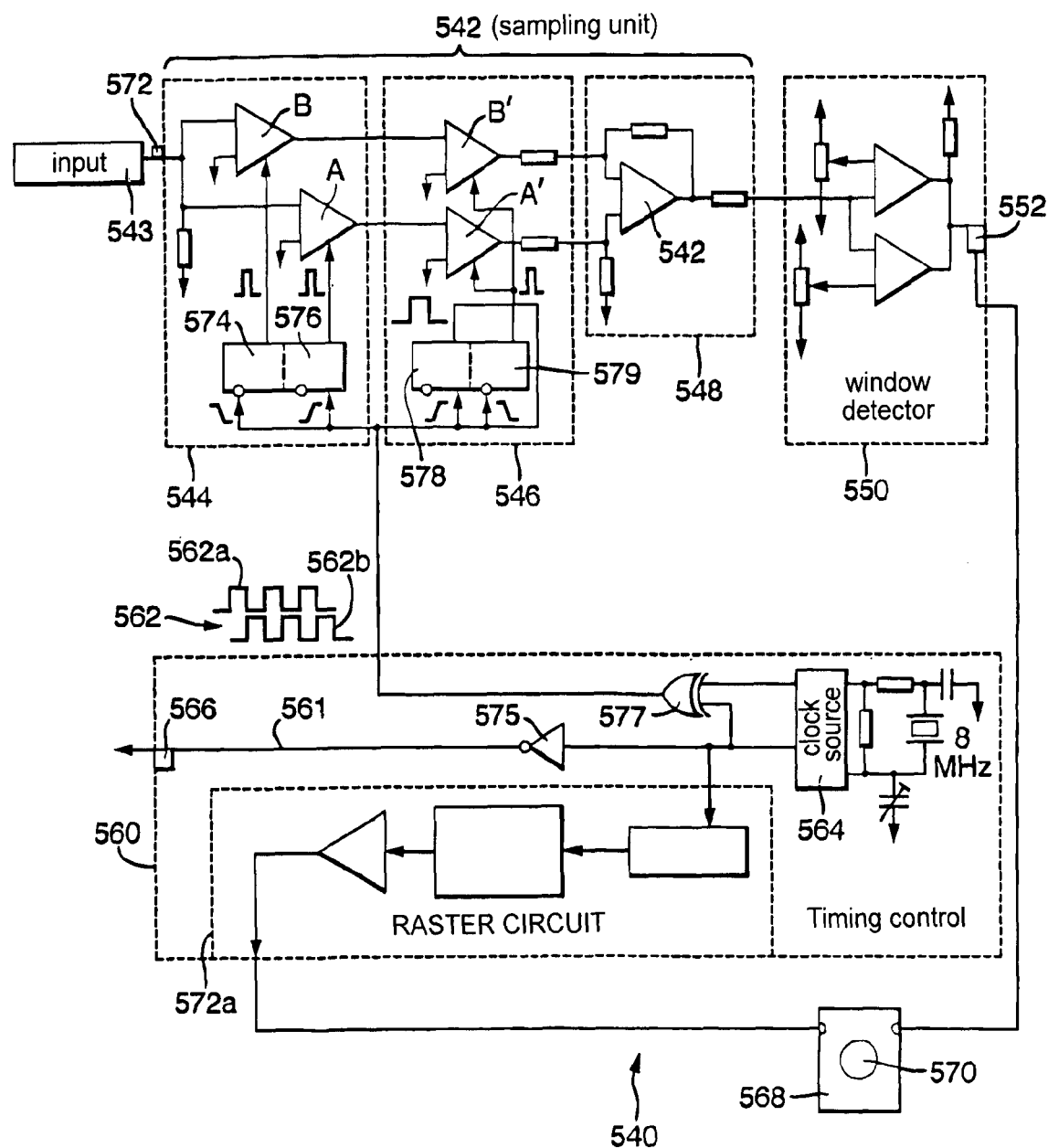
FIG. 6 shows a signal processing circuit for use with the system of FIG. 1.

FIG. 6 shows details of the signal processing unit 540, also connected to the photo-receiver 51, for determining the position of a disturbance based on OTDR. The signal processing unit 540 includes a sampling unit 542, here an analogue differential sample and hold circuit, which circuit is connected to the filter 52 at an input 543. The sampling unit 542 is configured to sample the incoming signals from the MZ coupler 28, in particular from the filter 52 which in turn receives signals from the photo receiver 51. The sampling unit 542 includes: a sampling stage 544 configured to sample the incoming signals at spaced apart time positions; and alignment stage 546 for aligning the signals previously sampled at spaced apart positions; and, a comparison stage 548 for comparing the re-aligned signals, in particular for evaluating the difference between the signals. Signals from the comparison stage 548 are passed to a window detector circuit 550, configured to generate an output at a signal output 552, in particular if the output signal from the comparison stage 548 departs from a centre value by more than a threshold value.

A timing control circuit 560 is included for providing trigger signals 561 for triggering the driver unit of the optical source 18 such that the source emits a pulse in response to each trigger signal. The timing control circuit 560 also generates clock pulses 562 which clock pulses control the operation of the sampling unit, in particular the sampling stage 544 and 546. The trigger signals 561 and the clock pulses 562 are generated by a common timing source 564, which may for example be a clock circuit. The trigger signals 561 may be tapped at a trigger output 566 and are fed to the trigger of an oscilloscope 568. The signal output 552 can then be fed to a signal input of the oscilloscope 568, which is preferably a storage oscilloscope, and viewed on a display 570. A raster circuit 572a may be provided to generate a raster signal which can be fed to the oscilloscope for generating a two-dimensional display. Further gates 575 and 577 are included in the timing control circuit as indicated in FIG. 6.

The clock pulses in the present example are at a frequency of 0.5 MHz and are of the alternating phase type, that is, a wave train is generated with one phase 562a, and another train is generated at a phase shift of 180 degrees. The timing control circuit is configured such that the clock phase alternates on every trigger pulse to the optical source 18, and also synchronises the raster generator for generating the two-dimensional display. The two-dimensional representation will allow the time-evolution of the backscatter signal from each position in the fibre to be observed on the display 570 of the storage oscilloscope 568. The digital and analogue electronics used separate, regulated and de-coupled power supplies (in FIG. 6, upward pointing arrow indicates a connection to a positive supply rail, whilst downward pointing arrows show a connection to ground or the negative supply rail).

In more detail, the sampling unit 542 includes a copying stage 572, which could be a simple "T" connector, for generating copies of the input signal (that is, the OTDR signal or a signal equivalent to the interference signal in the electrical domain).

The sampling stage 544 has two sampling amplifiers A, B, each of which are triggered to sample by a respective pulse unit 574, 576, the pulse units being fed with clock pulses from the timing control circuit 560. The copies A and B each respectively enter amplifiers A, B, where respective discreet-time pulse amplitude copies are generated. The pulse units 574, 576 are arranged such that the sampling instance of the two copies (A and B) is offset by a range resolution interval, here one microsecond. The signals from sampling amplifiers A, B are then passed respectively to further sampling amplifiers A' and B' of the alignment stage 546, where these samples are then re-sampled.

The further sampling amplifiers A', B' or equivalently sampling gates are triggered by respective pulse units 578, 579 (the pulse units 578, 579 being driven by clock pulses from the timing control unit 560). The further amplifiers A', B' are operated in such a way (through the timing of the pulse units 578, 579) that the re-sampled signals of the A copy precede the sampled signals of the B copy: this means that the A samples originate from a range resolution cell which immediately precedes that of the B signal. The result of this re-sampling strategy is that sampling points "walk" along the fibre link 16 (separated by a distance corresponding to one microsecond), but with a step size of two microseconds (assuming the pulse initially transmitted by the optical source onto the fibre link 16 are one microsecond in duration).

The comparison stage 548 includes a difference amplifier 549 for evaluating the difference between the twice sampled signals A and B: that is, the output of the difference amplifier gives an output related to A–B. Because the A and B traces are re-aligned before being compared, it may be considered that the a values related to slope or gradient of the time-dependence of the signals is obtained. Effectively, the time-dependent sampled signals are differentiated: that is the difference between neighbouring samples is evaluated (although the samples need not necessarily be immediately neighbouring samples).

Figure 7:
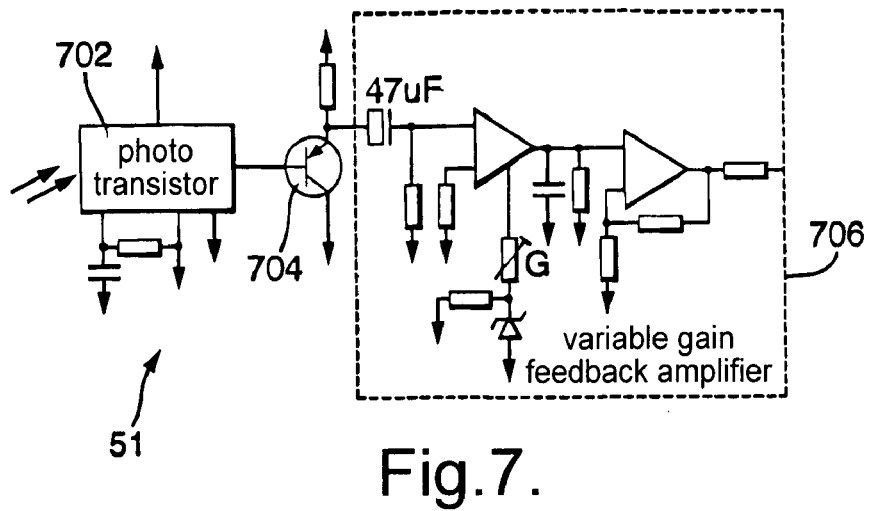
FIG. 7 shows a photo receiver circuit.
Figure 8A:
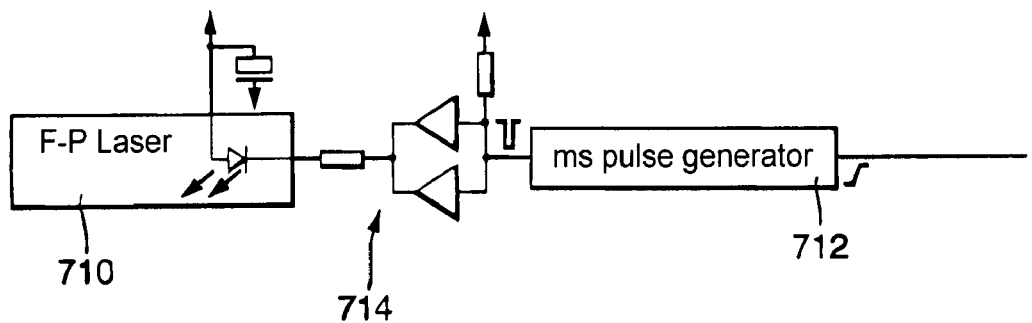
FIG. 8a shows an optical source circuit.
Figure 8B:
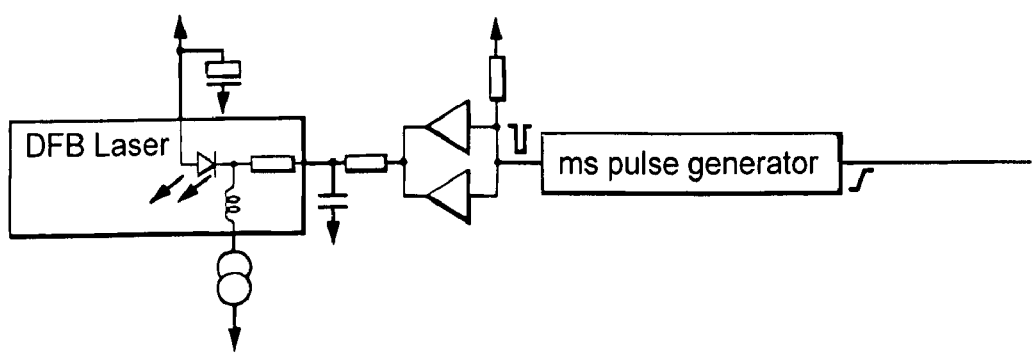
FIG. 8b shows another, less preferred optical source circuit.

The photo receiver 51 is shown in more detail in FIG. 7. Light from the coupler 28 is incident on a photo transistor 702, here a PIN-FET, which produces an electrical output that is fed to a bipolar transistor 704, acting as a buffer, before being fed to a variable gain current feedback amplifier 706. In FIG. 8a, the optical source 18 is shown in more detail. Light for transmission onto the link 16 (through the interferometer stage) is generated by a Fabry Perot Laser 710. The trigger signal 561 from the timing control circuit 560 is received at a mono stable pulse generating unit 712, which generates a pulse for each trigger signal received, this pulse being amplified by a booster amplifier 714 so as to drive the laser 710. FIG. 8b shows an alternative in which a DFB laser is used.

However, it has been found that a DFB laser can give rise to coherence noise, and instability.

Figure 9A:
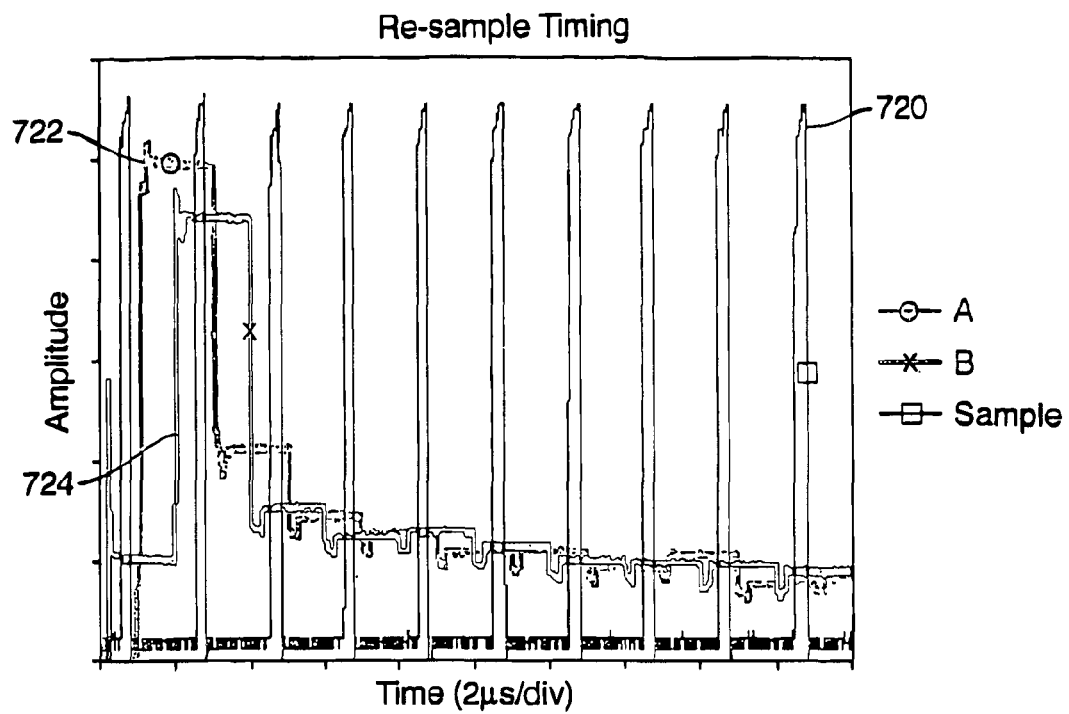
FIGS. 9a-9c show measured traces of sampled return signals.
Figure 9B:
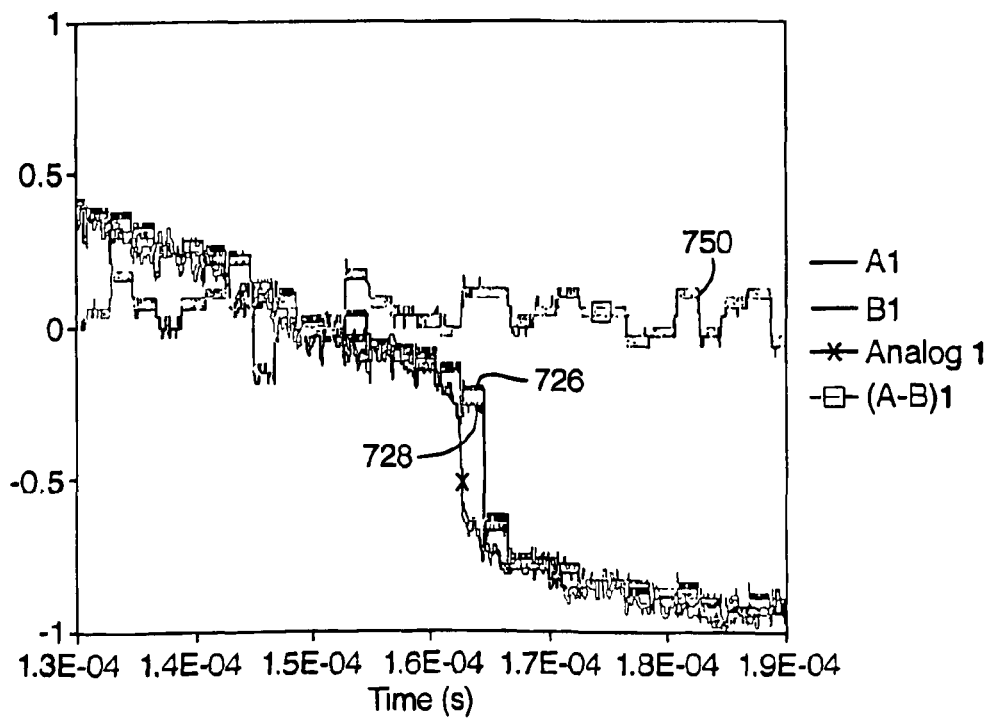
Figure 9C:
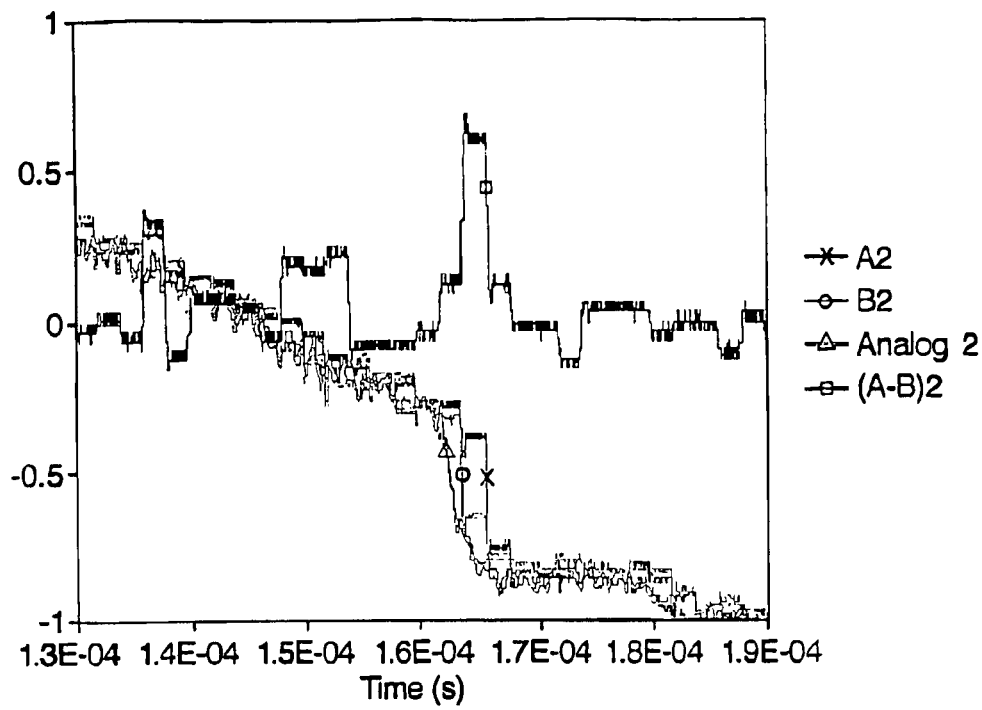

FIGS. 9*a*, 9*b*, and 9*c* show the sampling waveforms at various points in the signal processing unit 540. FIG. 6*a* shows the position of the regular (re)sampling pulses relative to the pulse amplitude modulated sampled waveforms A and B. In FIG. 6*a*, repeating sample pulses 720 are shown (darkest line). The A sampled signal (the output from amplifier A) is shown in the grey line 722, whilst the B sampled signals (that is, the output from the amplifier B) are shown by the lighter line 724. As can be seen from the "A" trace, the amplitude of the backscattered signal decreases as the elapsed time (since the launch of a test pulse from the optical source) increases, as is normally expected in OTDR. The amplitude of the "B" trace 724 likewise decreases with the elapsed time, but is shifted relative to the A trace.

In FIG. 9*b* the re-sampled signals A and B (that is, outputs from sampling amplifiers A' and B') are shown, the A sample being the darker trace 726 whilst the B sample is the lighter trace 728. Because the two signals have been re-sampled, as explained above, these are now aligned. The difference in the A and B re-sampled signals (that is, the output (A–B) from the comparison stage 548) is shown by the lighter trace 730. Although there are no apparent features indicating a disturbance in this trace, the (A–B) trace of FIG. 6*c* clearly shows a feature at about 165 microseconds (the time corresponding to the step change in curves A and B). The difference between the traces of FIGS. 6*b* and 6*c* is that the clock signals driving the sampling amplifiers has zero phase shifts in FIG. 6*b*, but a 180 degrees phase shift in FIG. 6*c*. This illustrates how by generating a first (A–B) trace with a clock signal at one phase, and another (A–B) trace with the clock at a phase offset by 180 degrees, gaps between the sampling cells in one trace can be effectively removed by sampling in cells which are shifted by one cell length. In this way, the resolution of the present embodiment is one microsecond, corresponding to a length of the order of 100 metres. Thus, the resolution length is equivalent to the pulse length of the sensing signals from the optical source 18.

Figure 11A:
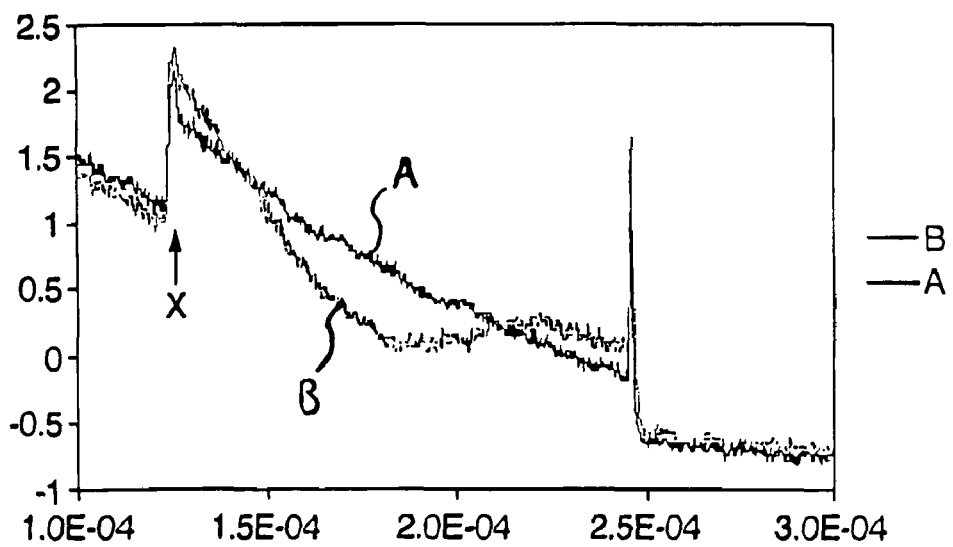
FIG. 11a shows a measured return signal.

In FIG. 11*a*, there is shown an OTDR trace (trace A), plotted as amplitude of the interference signal against elapsed time from the transmission of a pulse pair. The amplitude initially decreases as expected from the distributed (here mainly Rayleigh) backscattering as the pulse propagates along the fibre. At time X when the pulse reaches the position of a dynamic disturbance, the interference signal from the interferometer increases due to the relative phase change between the return pulses interfering at the interferometer coupling stage 28, which phase change has been induced by the disturbance. Backscattered signals originating from the pulses that have traveled beyond the disturbance point will also affected, and hence the effect of the disturbance is to shift the normal backscattered trace up or down from the disturbance point (time) onwards. Trace A is for a low magnitude disturbance, whereas trace B is for a higher magnitude disturbance where the non linear response of the fibre changes the shape of the trace. For both traces, a clear step change can be seen at time X, indicating that the disturbance has occurred at a distance of 2vX from the monitoring station, where v is the speed of a pulse along the fibre, X being the elapsed time from the transmission a pulse to the receipt of the returned signals responsible for the step change.

It can be seen from FIG. 11*a* that the occurrence itself of a disturbance can be inferred from the inspection or an analysis of the return OTDR (interference or other combination) signal, even when the interference signal is the result of backscattering from a short pulse, rather than reflection of a continuous signal from an end mirror. However, the large bandwidth of the circuitry typically needed to accommodate the short pulses used in OTDR will normally introduce noise, making a disturbance harder to detect. On the other hand, the lower bandwidth amplifier that can be used with a interference signal is normally less noisy, making the system more sensitive to the occurrence of a disturbance.

The delay line will preferably be at least 20 km since when a disturbance is small (i.e., such that the fibre phase changes respond linearly) the interferometer system becomes less sensitive to disturbances having characteristic frequencies that are less than the inverse of the delay time. The pulses are typically of 1 μs duration, sent every 1 ms. Thus with a delay line of about 20 km corresponding to a delay of about 100 μs, the pulse (signal) copies will be separated as they travel along the fibre. However, for longer pulses, or a shorter delay, or even a continuous signal, signal copies will be overlying one another. Furthermore, for a continuous signal, a signals be discrete entities, since consecutive signals will be joined seamlessly as a continuous waveform.

The oscilloscope device 568 has an output 569 for the output of a trace signal, which trace signal contains the necessary timing information and signal magnitude information to reproduce a trace corresponding to that of the display 570 (see for example trace A of FIG. 8*a*). The transmitter station 106 of FIG. 1 is coupled to the oscilloscope output 569 so as to receive the trace signal, and to transmit the trace signal to the received station 110. In this embodiment, the receiver station 110 will have a display 111 for displaying the trace signal, which trace signal will be a reproduction of the trace displayed at the oscilloscope 568. However, the monitoring station may have a processor means configured to analyse the trace signal to detect an abnormal feature such as a step change, and to compute the distance of a disturbance based on the time position of the step change, so as to provide a distance reading. Thus, a trace need not actually be displayed.

Figure 12:
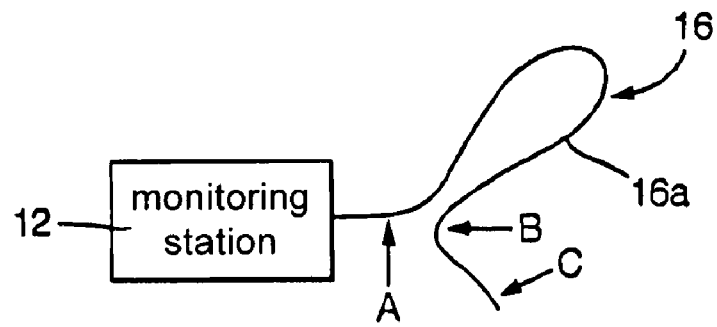
FIG. 12 shows a looped fibre path.

Returning to the embodiment of FIG. 1, an operator in the field, remote from the monitoring station 12 will, by virtue of FIG. 6, be able to obtain an indication of the distance along the fibre path between the monitoring station 12 and the point D where the disturbance has been introduced. This will be important when mapping the path of a fibre, in particular if the fibre 16 is likely to follow a looped or other curved path. This can be seen more clearly in FIG. 12, where there is shown a fibre 16 following a path having a loop portion 16*a*. The detection of the presence of the fibre at points A, B and C (using for example audio signal from the processing unit 54) could give the impression that the fibre takes a straight (short) path between A and B whereas the fibre in fact follows an extended path in the form of a loop portion. In such a situation, the trace signal will provide an indication of the length of fibre between the monitoring station 12 and the point where the fibre has been sensed. If the geographical separation between points A and B does not correspond to (i.e. is more than about 10% shorter than) the difference in the fibre path length between the points A and B, a person attempting to map the fibre can infer the presence of the looped portion 16*a*, and can introduce disturbances at more closely spaced intervals in order to better follow the path of the fibre, in particular the path of the looped portion 16*a*.

To map the position of an underground fibre, an operator may register the position at which a disturbance produces a sensor signal, then move a short distance, generate another disturbance, register the new position if this further disturbance is sensed by the fibre, and so on and so forth. The position of each sensed disturbance may be obtained using a positioning device, such as a Global Positioning System (GPS) receiver, which GPS receiver is configured to provide a geographical reference, such as a map reference or co-ordinate, based on readings from a plurality of orbiting satellites. The set of geographical references (each member of the said corresponding to a sensed fibre position) can then be stored in a memory device which may be provided in the receiver station 110. The set of geographical reference points will then provide a mapping of the fibre 16.

The trace signal may be used to infer the presence of a fibre in the vicinity of a generated disturbance, since the disturbance will introduce distinguishable features into the trace signal, as discussed above. However, preferably, the audio amplifier 54 will be used to infer the presence of a fibre, since the audio amplifier is likely to have a lower bandwidth than the OTDR processing unit 540, thereby reducing the level of background noise and making it easier to detect a disturbance.

Furthermore, a user may be able to infer an indication of the distance of the fibre from the disturbance by the level, quality, or other characteristic of the audio signal. The user can then generate disturbances at different points and gauge whether the user is getting closer or further from the fibre. Once the presence of the fibre has been sensed, or when it has been inferred that the fibre is sufficiently close to the impact point of the disturbance, the source 18 can be configured to transmit pulses, and the path distance can be evaluated from the OTDR trace displaced on the receiver display 111.

The switching of the source from continuous mode to pulse mode may be effected manually at the monitoring station 12, or alternatively, a control signal may be transmitted by the receiver station 110 to control the configuration of the monitoring station 12. In such an automated mode, the monitoring station may include a processor means to analyse the trace signal to determine the path distance of a disturbance at one location, repeat such an analysis when the operator (and the disturbance) is at another location, and calculate the difference in path length between the two locations, transmitting the path difference to the receiver station (control signals from the receiver station may be transmitted to the monitoring station to indicate when a fibre has been located, when a fibre path length measurement is to be made, etc.). The receiver station may be equipped or connected to GPS means to detect the actual geographical positions of the two locations, such that processor means associated with the receiver can compare the fibre path difference on the one hand with the geographical difference between the two locations on the other hand, and generate an alert if the path difference exceeds the geographical beyond a tolerance level.

In summary, at least part of the description above relates to the monitoring a communications link to detect a physical disturbance in the link, so as to thereby infer the presence of a fibre in the vicinity of the disturbance. The position of the disturbance is then estimated using optical time domain reflectometry. To do this, a series of low coherence test pulses is launched into an optic fibre via an unbalanced Mach Zhender interferometer (forward direction). The time dependence of the relative phase of the backscattered return signals (that is the returned signal copies of a pair) is monitored by means of the interferometer for abnormalities due to external disturbances in order to allow their distance along the fibre path to be determined. From the elapsed time between the transmission of a test pulse and the arrival time of an abnormal feature in the backscattered signal, the position of the disturbance causing the abnormality can be inferred.

The following explains the theory behind at least some aspects of the above embodiments. Scalar Interferometer OTDR Theory: the theoretical operation of the interferometer OTDR using a pulsed probe signal to excite a distributed Rayleigh backscatter signal in order to give disturbance position information is rather involved. The problem is best understood by first considering a discrete reflector and a continuous wave excitation signal.

For a 'point' disturbance of the form $m(t) \approx \exp(-j\phi_m(t))$. Under cw excitation, it can be shown that the "ac" term at the output of the sensor is given by ...

$$z_{ac}(t) \propto 2 \cdot \text{Cos } [\phi_m(t-\tau) + \phi_m(t-2T+\tau) - \phi_m(t-\tau-D) - \phi_m(t-2T+\tau-D)] \quad (1)$$

where, T is the time of flight of the reflection point from the start of the fibre under test, and $\tau$ is the time of flight to the point of the disturbance. D is the unbalanced delay in the interferometer.

If we consider a sinusoidal modulating disturbance of the form $\phi_m(t) = a \cdot \text{Sin}(\omega_m t)$, then equation (1) becomes ...

$$z_{ac}(t) \propto \text{Cos}\left[4 \cdot a \cdot \text{Sin}\left\{\frac{\omega_m D}{2}\right\} \cdot \text{Cos}\{\varpi_m(T-\tau)\} \cdot \text{Cos}\left\{\varpi_m\left(t-T-\frac{D}{2}\right)\right\}\right] \quad (2a)$$

which can be put in the form ...

$$z_{ac}(t) \propto \text{Cos } [R_2 \cdot \text{Sin}(\tilde{\omega}_{in} t - \psi_2)] \quad (2b)$$

This is a classical result for angle modulation and can be evaluated using Bessel functions of the first kind. The angle modulation depth $R_2$ is a function of the amplitude a, position $\tau$, and the frequency $\omega_m$, of the disturbance and given by $$R_2 = 4 \cdot a \cdot \text{Sin}\left\{\frac{\omega_m D}{2}\right\} \cdot \text{Cos}\{\varpi_m(T-\tau)\}. \quad (2c)$$

From (2c), it follows that the modulation depth will undergo minima and maxima at the following points in time and frequency ...

$$\text{Min when } f_m = \frac{n}{D}, \frac{2n-1}{4(T-\tau)}; \text{ Max when } f_m = \frac{2n-1}{2D}, \frac{n}{2(T-\tau)}$$

where n is an integer in the range $[-\infty, \infty]$.

Figure 10A:
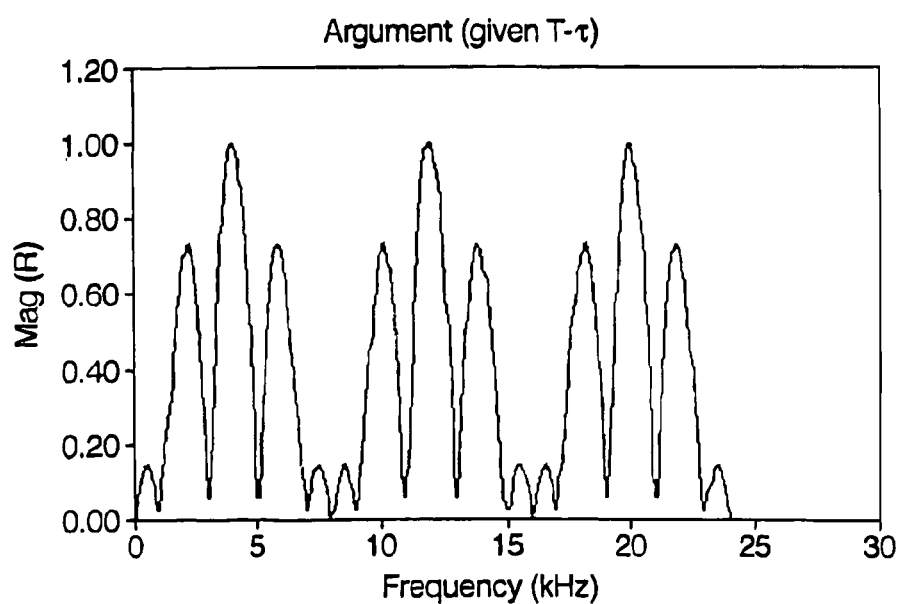
FIGS. 10a, 10b are theoretical curves illustrating how the sensitivity of the monitoring system changes with applied disturbance frequency and distance, respectively.
Figure 10B:
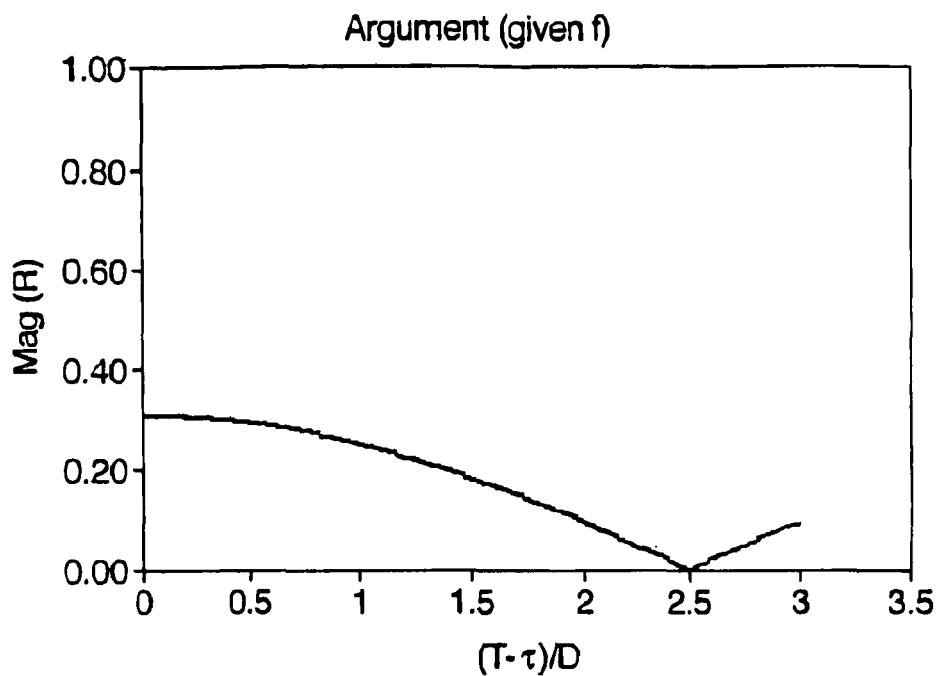

FIG. 10a,10b show examples plots of equation (2c) for various values of modulating frequency, interferometer delay D, and relative disturbance location $(T-\tau)/D$, in particular for 4a=1, D=25 km (the delay line will preferably be at least 20 km), $T-\tau=2D$ and $f_m=0.8$ kHz FIG. 10a effectively shows how the response of the sensor, that is, its sensitivity, as a function disturbance frequency, illustrating the effects of the non linear response of the fibre to disturbances.

Pulsed probe signal: a simple way of examining the OTDR approach is now to consider the fibre as comprising n distributed reflections where each reflection is located in an OTDR range resolution cell. The cell size is defined by the duration of the OTDR probe pulse $(\tau_W)$ and is typically 1 μs (corresponding to ~100 m resolution). The amplitude and phase of the signal reflected from each cell being a function of the fibre attenuation (to/from the cell) and the ensemble average of the component scattering centres within it. Each cell now takes on the role of the discrete reflection described above and therefore defines T. Indeed, T now takes the form of a set of points $T_i$ where i=1 to n.

The formulation of the resulting signal can now be derived from equation (1) providing we introduce the excitation signal which is described by the OTDR pulse probe signal $p(t)=P_O \cdot rect[t/\tau_W]$.

$$z_{iac}(t)=K_i(t-D-2T_i) \cdot \text{Cos}\ [\phi_m(t-\tau)+\phi_m(t-2T_i+\tau)-\phi_m(t-\tau-D)-\phi_m(t-2T_i+\tau-D)] \quad (3)$$

where, $z_{iac}(t)$ is the ac component of the signal from cell i, and, $$K_i(t)=|p(t) \otimes h_i(t)|^2 \quad (4)$$

is the convolution between the OTDR probe pulse and the i-th range resolution cell.

The important point to note is that the random phase component from the scattered signal in the i-th cell is lost in the detection process ($|\cdot|^2$ operator in equation 4), so it does not impair the results.

Thus, equation (4) shows that the resulting signal with an OTDR can be interpreted using the simpler formulation of equations (1) and (2). However, the signal at each resolvable point on the OTDR trace is found by substituting the appropriate value for $T_i$ into these equations. The amplitude of the signals is also modified by the characteristic exponential decay of an incoherent OTDR signature.

Figure 11B:
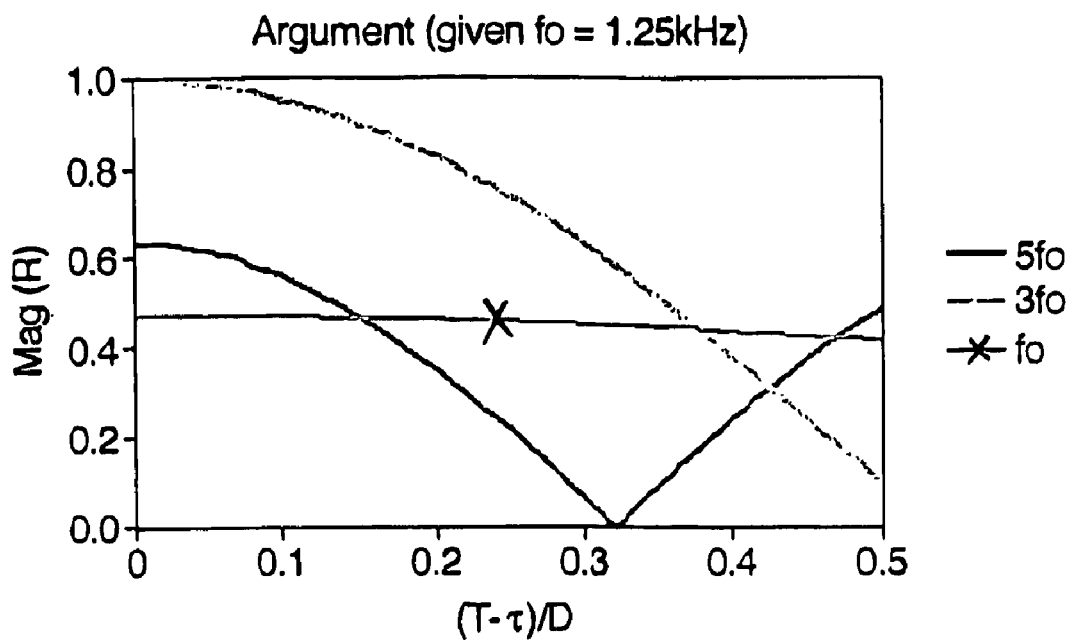
FIG. 11b shows a plurality of further theoretical curves.

This simple model explains the shape of the OTDR traces seen in the practical experiments. FIG. 11a shows a single-shot measured OTDR trace with a tone disturbance of 1.25 kHz located at position X (horizontal axis is time, vertical axis is the level of the (combination) signal from the interferometer stage. Curve (A) shows a typical single pulse response when the disturbance modulation depth is small. From pulse to pulse, the level moves up/down along the entire length of the trace at the disturbance modulation rate. However, as the modulation depth is increased, the trace begins to show structure along its length (curve B). This structure also vibrates up/down from pulse to pulse. (FIG. 11(a) shows measured OTDR trace from a test fibre of length ~D/2 (D=25 km). FIG. 11(b) shows theoretical magnitude of the disturbance length distribution (equation 2c) for the fundamental and first two odd harmonics of the disturbing tone.

Thus, the disturbance feature at the time position (corresponding to the spatial position) X is in this example a sharp change, here an increase, in the interference signal, although the change could be a decrease, as shown in the example of FIGS. 9a-9c.

This length dependent structure is predicted by the modelling. FIG. 11b shows the magnitude of the resulting modulation depth (equation 2c) as a function of the odd harmonic frequencies that will be generated by increasing the magnitude of the disturbance. (T−τ)/D corresponds to the distance between the disturbance point "X" and the i-th scattering region. There is clearly a null at the $5^{th}$ harmonic at a point just over half way along the fibre. The OTDR traces show the characteristic length distribution variations predicted by the theory.

Signal Processing to extract position information: The OTDR traces in FIG. 11a show that even a point disturbance can result in a distributed feature along the backscatter signature. However, there is normally an abrupt change in the signature at the point where the disturbance occurs. FIGS. 9b and 9c show this. These real-time analogue backscatter signals show that the start of the disturbance can be located with an accuracy that is determined by the OTDR range resolution (~1 μs in this case). Thus, the signal processing system is designed to look for these features by comparing the signal from two adjacent range-resolution cells (A) and (B). By performing the difference between them, the slower structure shown in FIG. 8a will disappear (adjacent cells are correlated unless there is a disturbance located between them). Thus, in principle, any number of simultaneous disturbances can be located by this technique.

The window detector (FIG. 6) can be used to select (A−B) features above a certain magnitude in order to produce a range marker (or bright-up spot) on the OTDR trace. Similarly, a two-dimensional "television like picture" of the disturbance can be formed. In this case, the x-direction corresponds to distance along the fibre, the y-direction to the disturbance time history for every range resolution cell, and the z-modulation is driven by the window-detector output.

Figure 13:
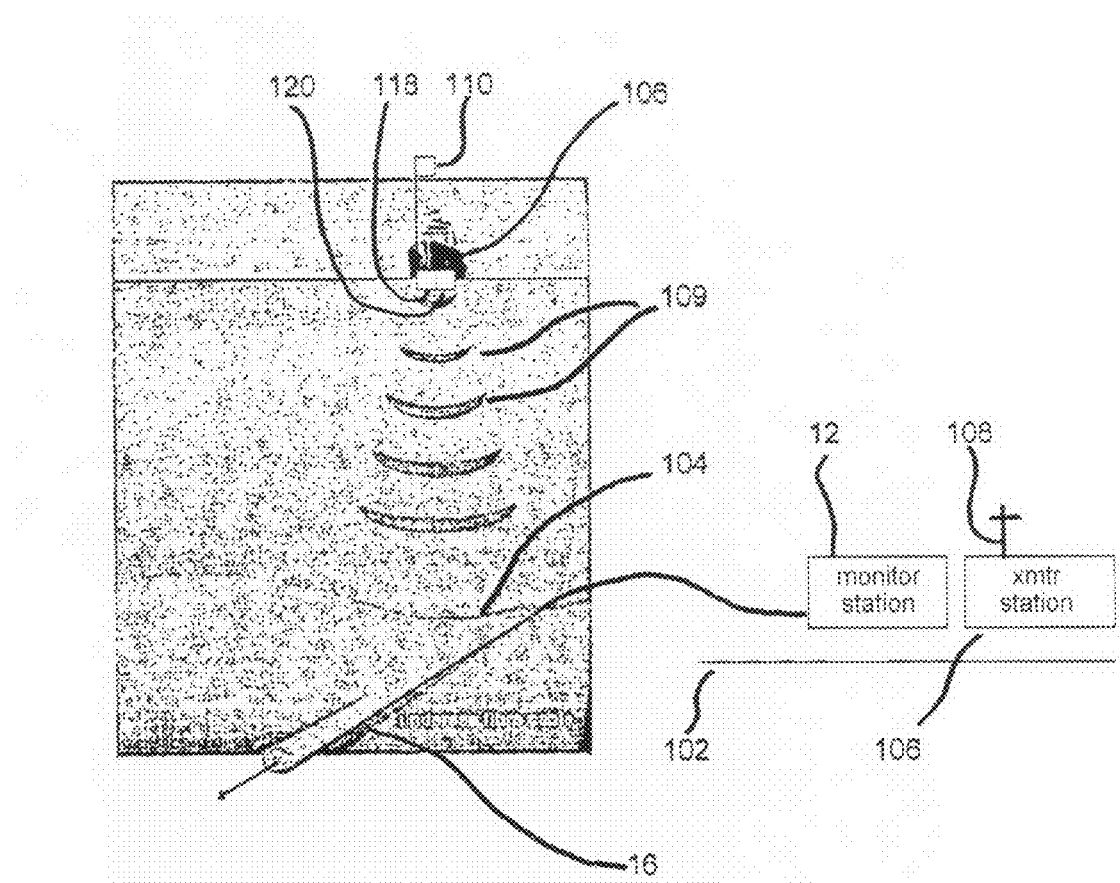
FIG. 13 shows a system for locating a subsea fibre cable.

The monitoring station of FIG. 4 may be used to monitor disturbances applied to an undersea fibre cable 16, in order to facilitate the location of the cable as shown in FIG. 13. Here, the monitoring station 12 is situated above sea level on a ground surface 102, whilst at least a portion of the fibre cable 16 connected to the monitoring station 12 is located on the seabed 104. A ship 106 has a transducer 118 (at least a one way transducer) for producing sonar waves or other acoustic disturbances 109. The acoustic disturbances are transmitted in a generally downward direction (possibly in a direction that is at an angle to the vertical direction). When the ship 106 is sufficiently close to a portion of the fibre cable 16, the transmitted acoustic signals 109 will cause an acoustic disturbance (an acoustic elastic wave) in the fibre cable, which acoustic disturbance is of sufficient magnitude for light propagating along a waveguiding medium of the cable to be phase modulated by the acoustic disturbance. The acoustic disturbance will then be detected at the monitoring station 12 as described above with reference to preceding embodiments. Clearly, the detected signal will increase in amplitude as the ship 106 moves closer to the cable 16, reaching a maximum when the ship is above the fibre cable, or in the near vicinity of the fibre cable. The ship will preferably have a radio communication station 110 for receiving a signal from the monitoring station 12, indicating the strength of the sensed disturbance produced by the sonar. An operator on the ship will thus be able to determine when the ship is above a cable. Alternatively, the transducer 118 will be coupled to a modulator 120, such that the amplitude of the acoustic vibrations produced by the transducer 118 can be modulated by an information signal. The information signal will then be translated into an amplitude signal governing the amplitude of the interference signal (combination signal) from the interferometer 20 of the monitoring station 12. The information signal will preferably indicate the geographical position of the ship, such that a person on the shore can map the positions at which the cable is present. In an alternative embodiment, the sonar transducer may be located on a device that is drawn by the ship by a line. Such a device, also known as a sonar pinger device, may be weighted and suspended below the ship rather than a permanent fixture on the hull. With this embodiment the pinger travels through the sea at a depth that is closer to the sea bed than the ship.

Conveniently, an existing device for generating a disturbance as part of a sound navigation and ranging system may be used. Because existing conventional sonar systems will transmit bursts or pulses of acoustic vibrations, with quiet periods separating the bursts, the delay period of the interferometer stage will be less than the quiet intervals. This will reduce the likelihood that data modulated on one pair of signal copies will mix with data from another pair of signal copies. However, the delay period will also be sufficiently long for the low frequency cut-off in the response of the interferometer sensing system to be above the transmission frequency of the sonar waves (in particular if the sonar waves carry information). Typically, the delay length will be 20 km, which corresponds to a delay period that is comfortably less than the extent of the quite periods in existing sonar systems.

Thus, a conventional sonar system may be used to map the seabed by transmitting a disturbance and monitoring the reflective signals, whilst at the same time the fibre cable whose location needs to be identified can be monitored at the monitoring station. For example, side-scan sonar system can be used, in which ultrasound pulses of 2.5 ms duration having a bandwidth of 4.0 kHz with a centre frequency of 40 kHz are transmitted. Alternatively, pulses with a central frequency of 75 kHz and a bandwidth of 7.5 kHz and a duration of 15 ms can be used.

Generally, if information is to be conveyed from a submerged transducer to a submerged fibre cable, the transducer will be driven by a driver circuit, which driver circuit will generate a driving signal at the frequency at which acoustic waves are generated. The driver circuit will have an input for receiving an information signal to be carried by the acoustic waves, the driver circuit being configured to modulate the driving signal such that the amplitude of the driving signal is representative of the information signal. In this way, the acoustic signal propagating through the liquid (here water) will be amplitude modulated with the information signal, which information signal may be digital or analogue.

Although the above embodiment relates to the location of cables, the above considerations will apply generally to the communication of information by: generating acoustic waves at transmission location; transmitting the acoustic waves through a liquid medium such that the acoustic waves reach a waveguide with sufficient amplitude to cause a modulation of light travelling along the waveguide. The transmission location may be at a moving or movable platform. Alternatively, the transmission location may at a fixed or other stationary platform, in particular in situations where the location of the cable is known (for example if information from a seismic sensor is relayed to the cable). If the platform is fixed, it may be retained above the sea bed by a flotation system, the transmission of the acoustic signal being oriented in a generally downward direction, possibly in an angled direction from the vertical direction, if the transmission location is not directly above the cable. However, the transmission location may be on the sea bed itself. The transmission location will normally be spaced apart from the waveguide (for example, at least 100 m or 1 km), the liquid medium extending between the waveguide and the transmission location. The waveguide will normally be housed within a cable, the cable being either immersed in the liquid medium or buried in a solid or particulate medium, such as that provided by the silt on the sea bed.

The follow additional comments are provided with reference to FIG. 13.

In one embodiment, a side-ranging sonar system used by a repair ship operates by sending an acoustic signal from the underside of the hull down towards the sea floor. The frequency of that signal will be typical of sonar systems, falling within the range 1-20 kHz approximately, which corresponds well with the sensitivity range of the BT fibre sensor. By deploying the fibre sensor at the shore station of the undersea cable, the sonar signal can be detected as the repair ship passes over the cable—see FIG. 13: using a downward radiating acoustic signal to locate an undersea fibre cable.

The footprint of the acoustic signal on the sea floor from a side-ranging sonar system is potentially large, say 5 km across. That limits the accuracy of locating the undersea cable by listening for the acoustic signal at the shore station. A sonar system capable of reducing the footprint on the sea floor to about 100 m could deliver better accuracy for mapping the path of the cable. Alternatively a highly directional sonar pinger on the underside of the ship's hull, or lowered over the side into the sea, will produce a smaller footprint on the sea floor.

In either case the acoustic signal will be recovered at the shore station and the intensity will be at its maximum when the repair ship is directly over the cable. Additionally a predetermined data packet or data stream could be modulated on to the sonar signal to allow it to be more easily distinguished from background noise, thus improving the overall sensitivity of the fibre sensor system. GPS can then be used to log that portion of the cable precisely. By repeating this process at appropriate intervals along the cable, say every few kms, a precise map can be created.

What is claimed is:

1. A method of locating or identifying a waveguide, the method comprising:
    (a) monitoring the waveguide at a first position by transmitting sensing signals onto the waveguide, which sensing signals are in the form of pairs of signal copies introduced onto the waveguide with a time delay relative to one another, to sense a disturbance along the waveguide;
    (b) causing a disturbance to the waveguide at a second position;
    (c) transmitting a sensor signal from the first position responsive to said monitoring of the waveguide sensing a disturbance of the waveguide; and
    (d) inferring, from the sensor signal, the presence or identity of the waveguide at the second position, the inference being made at the second position, wherein at least some of the sensing signals that have traveled at least to the second position are caused to return to the first position; and
    wherein returned signal copies of respective pairs are temporally re-aligned.

2. A method as claimed in claim 1, wherein interferometer means having a path difference associated therewith are used to cause the time delay between signal copies of a pair.

3. A method as claimed in claim 1, wherein signal copies of a pair are introduced in the same sense along the waveguide.

4. A method as claimed in claim 1, wherein signal copies of a pair are introduced at a common point along the waveguide.

5. A method as claimed in claim 1, wherein the disturbance is caused by striking the waveguide.

6. A method as claimed in claim 5, wherein an audio signal is used to generate an audible signal representative of the disturbance.

7. A method as claimed in claim 1, wherein sensing signals are returned by reflector means and or a process of distributed backscattering in a portion of the waveguide.

8. A method as claimed in claim 1, wherein the disturbance is applied to each of a plurality of waveguides, at least one of the waveguides being sensed for the disturbance, the identity of the sensed waveguide being inferred from the received sensor signal.

9. A method as claimed in claim 1, wherein the first and second positions are located at respective first and second locations, which locations are geographically separate, the sensor signal being transmitted from the first location to the second location by wireless means.

10. A method as claimed in claim 1, further comprising determining the path length of the fibre between the first location and the second location.

11. A method as claimed in claim 1, wherein the disturbance is generated by transmitting acoustic vibrations through a fluid medium.

12. A method as claimed in claim 11, wherein the fluid medium is a liquid.

13. A method as claimed in claim 12, wherein the acoustic vibrations transmitted from a flotation structure.

14. A method as claimed in claim 13, wherein the flotation structure is a ship.

15. A method as claimed in claim 11, wherein the waveguide is a subsea waveguide and the acoustic vibrations are sonar vibrations.

16. A method as claimed in claim 1, wherein the waveguide is configured to carry the sensing signals in a single mode fashion.

17. A method as claimed in claim 1, wherein the sensor signal is received at the second location, such that the determination of the presence of the waveguide can be made at the second location.

18. A method as claimed in claim 1, wherein the waveguide is an optical fibre.

19. A method of locating or identifying a waveguide, the method comprising:
(a) monitoring the waveguide at a first position by transmitting sensing signals onto the waveguide, which sensing signals are in the form of pairs of signal copies introduced onto the waveguide with a time delay relative to one another, to sense a disturbance along the waveguide;
(b) causing a disturbance to the waveguide at a second position;
(c) transmitting a sensor signal from the first position responsive to said monitoring of the waveguide sensing a disturbance of the waveguide; and
(d) inferring, from the sensor signal, the presence or identity of the waveguide at the second position, the inference being made at the second position, wherein at least some of the sensing signals that have traveled at least to the second position are caused to return to the first position;
wherein interferometer means having a path difference associated therewith are used to cause the relative time delay between signal copies of a pair;
and wherein the interferometer means is used to temporally re-align the returned signal copies of a pair.

20. A method of locating or identifying a waveguide, the method comprising:
(a) monitoring the waveguide at a first position to sense a disturbance along the waveguide;
(b) causing a disturbance to the waveguide at a second position;
(c) transmitting a sensor signal from the first position responsive to said monitoring of the waveguide sensing a disturbance of the waveguide;
(d) inferring, from the sensor signal, the presence or identity of the waveguide at the second position, the inference being made at the second position,
(e) determining the path length of the fibre between the first location and the second location;
(f) causing a disturbance to the fibre at a third location;
(g) evaluating the difference in the path length of the fibre between the second and third locations; and
(h) if a difference in path length exceeds the geographical distance between the second and third locations, generating an alert signal.

21. A method of locating or identifying a waveguide, the method comprising:
(a) monitoring the waveguide at a first position to sense a disturbance along the waveguide;
(b) causing a disturbance to the waveguide at a second position;
(c) transmitting a sensor signal from the first position responsive to said monitoring of the waveguide sensing a disturbance of the waveguide; and
(d) inferring, from the sensor signal, the presence or identity of the waveguide at the second position, the inference being made at the second position, and
(e) determining the path length of the fibre between the first location and the second location;
wherein the path length is determined by: copying, at least in part, an output signal from a source, such that there is a pair of signal copies; transmitting the signal copies onto the waveguide; receiving from the transmission link at least partially returned signal copies previously transmitted thereon; combining the received signal copies of a transmitted pair so as to produce a combination signal; and using a temporal characteristic in the combination signal to evaluate the position of the disturbance on the transmission link.

22. A method as claimed in claim 21, wherein the temporal characteristic includes the time at which a disturbance feature occurs in the combination signal.

23. Apparatus for locating or identifying an optical fibre, the apparatus comprising:
a monitoring station for monitoring a waveguide at a first position so as to sense a disturbance along the waveguide, the monitoring station being arranged to transmit a sensor signal indicative of a sensed disturbance, said sensor signal being transmitted in response to a sensed disturbance;
and a receiver station for receiving the transmitted sensor signal at a second position, such that the presence of the waveguide can be inferred at the second position from the received sensor signal,
wherein the monitoring station includes a transmission stage for transmitting, onto the waveguide, pairs of signal copies such that the signal copies of a given pair have a time offset relative to one another, and wherein the monitoring station includes a receiving stage for receiving signal copies previously transmitted onto the waveguide, the receiving stage being arranged, for received pairs, to cause one signal copy of a pair to mix with the other signal copy of that pair.

24. Apparatus as claimed in claim 23, wherein the sensor signal comprises an audio signal, and wherein the receiver station includes an audio output device for converting the audio signal into an audible sound representative of the audio signal.

25. Apparatus as claimed in claim 23, wherein the monitoring station and the receiver station respectively include wireless transmitter and receiver means such that the sensor signal can be wirelessly transmitted from the monitoring station to the receiver station.

26. Apparatus as claimed in claim 23, wherein the transmission stage and the receiving stage are formed in common by an interferometer stage.

* * * * *